(12) United States Patent
Smiddy et al.

(10) Patent No.: US 10,138,845 B2
(45) Date of Patent: *Nov. 27, 2018

(54) SYSTEM AND METHOD FOR COMBUSTING VOLATILE VAPORS

(71) Applicant: ProAct Services Corporation, Ludington, MI (US)

(72) Inventors: Gerard Willem Smiddy, Grand Rapids, MI (US); Frank Leslie Smiddy, Thompsonville, MI (US); Kyle Kirker, New Era, MI (US)

(73) Assignee: ProAct Services Corporation

( * ) Notice: Subject to any disclaimer, the term of this patent is extended or adjusted under 35 U.S.C. 154(b) by 0 days.

This patent is subject to a terminal disclaimer.

(21) Appl. No.: 15/888,635

(22) Filed: Feb. 5, 2018

(65) Prior Publication Data

US 2018/0156161 A1    Jun. 7, 2018

Related U.S. Application Data

(63) Continuation of application No. 15/613,729, filed on Jun. 5, 2017, now Pat. No. 9,885,317, which is a (Continued)

(51) Int. Cl.
*F02D 29/00* (2006.01)
*F02M 13/08* (2006.01)
(Continued)

(52) U.S. Cl.
CPC ............... *F02M 13/08* (2013.01); *F01N 3/10* (2013.01); *F02D 35/0053* (2013.01); *F02D 41/003* (2013.01); *F02D 41/021* (2013.01); *F02M 7/10* (2013.01); *F16K 37/0041* (2013.01); *G01M 15/102* (2013.01); *G01M 15/104* (2013.01); *F01N 3/08* (2013.01); (Continued)

(58) Field of Classification Search
CPC ... F02D 35/0053; F02D 41/003; F02D 41/021
See application file for complete search history.

(56) References Cited

U.S. PATENT DOCUMENTS

| 4,979,886 A | 12/1990 | Rippberger |
| 5,424,045 A | 6/1995 | Orman et al. |

(Continued)

*Primary Examiner* — Kevin A Lathers

(57) ABSTRACT

A system for combusting volatile vapors includes a carburetor having intake valves for receiving base fuel from a fuel source, ambient combustion air, and volatile vapors from a vapor source. A plurality of sensors measure and generate sensor data based on a respective plurality of physical properties associated with the carburetor and associate combustion engine operation. One or more programmable controllers receive the sensor data and control the intake valves to regulate respective ratios of the fuel, air, volatile vapors drawn through the carburetor based on the received sensor data. To increase the burn of volatile vapors, an engine loading system automatically operated by the controller(s) applies an automatically adjustable braking load on the engine. The load level applied is based on the sensor data and commensurate with maintaining stable engine running conditions. The loading system decreases time necessary to remediate a site.

24 Claims, 22 Drawing Sheets

Related U.S. Application Data continuation-in-part of application No. 15/385,084, filed on Dec. 20, 2016, now Pat. No. 9,777,675, which is a continuation of application No. 14/275,579, filed on May 12, 2014, now Pat. No. 9,523,330.

(60) Provisional application No. 62/436,813, filed on Dec. 20, 2016, provisional application No. 61/822,151, filed on May 10, 2013.

(51) Int. Cl.
| | |
|---|---|
| *F02D 35/00* | (2006.01) |
| *F02D 41/00* | (2006.01) |
| *F02D 41/02* | (2006.01) |
| *F01N 3/10* | (2006.01) |
| *F02M 7/10* | (2006.01) |
| *F16K 37/00* | (2006.01) |
| *G01M 15/10* | (2006.01) |
| *F01N 3/08* | (2006.01) |
| *F02M 25/08* | (2006.01) |
| *H04B 1/3822* | (2015.01) |

(52) U.S. Cl.
CPC .... *F01N 2560/025* (2013.01); *F01N 2560/06* (2013.01); *F01N 2560/14* (2013.01); *F02D 35/0023* (2013.01); *F02D 2200/701* (2013.01); *F02M 25/08* (2013.01); *H04B 1/3822* (2013.01)

(56) References Cited

U.S. PATENT DOCUMENTS

| | | |
|---|---|---|
| 7,487,923 B2 | 2/2009 | Willsford et al. |
| 7,934,663 B2 | 5/2011 | Willsford et al. |
| 9,885,317 B2 * | 2/2018 | Smiddy ............ F02M 13/08 |
| 2006/0272500 A1 | 12/2006 | Keller et al. |
| 2009/0036267 A1 | 2/2009 | Bellinger |
| 2013/0042832 A1 | 2/2013 | Park et al. |

\* cited by examiner

283

100-HOUR SERVICE

- Catalyst
- Muffler
- $O_2$ Sensor
- Thermocoupler
- Gas Meter
- Fuel Solenoid
- Starter
- Alternator
- Oil PSI Sensor
- Crank Trigger
- Coil
- Ignition Box
- Well Filters
- Engine $H_2O$ Pump

- Alternator Belt
- Carb Stepper Motor
- Spark Plug Wires
- Spark Plug
- Engine Vac Sensor
- Well Vac Sensor
- Dwyer MS 151
- TPS Sensor
- Hydraulic Temp Sensor
- Hydraulic PSI Sensor
- Engine Temp Sensor
- NOTES:

- HMI Screen
- Battery
- WEGO $O_2$ Box
- STP 1001 Box
- CON 1002 Box
- TCB 1003 Box
- GPS 1004 Box
- IO 1005 Box

BACK

FIG. 11

SYSTEM AND METHOD FOR COMBUSTING VOLATILE VAPORS

CROSS REFERENCE TO RELATED APPLICATIONS

The present application is continuation of U.S. application Ser. No. 15/613,729 filed Jun. 5, 2017, which is a continuation-in-part of U.S. application Ser. No. 15/385,084 filed Dec. 20, 2016 (now U.S. Pat. No. 9,777,675) and further claims the benefit of U.S. Provisional Patent Application Ser. No. 62/436,813 filed Dec. 20, 2016. U.S. application Ser. No. 15/385,084 is further a continuation of U.S. application Ser. No. 14/275,579 filed May 12, 2014 (now U.S. Pat. No. 9,523,330), which claims priority to U.S. Provisional Patent Application Ser. No. 61/822,151, filed May 10, 2013. The disclosures of all of the foregoing applications are incorporated herein by reference in their entireties.

FIELD OF THE INVENTION

The field of the present invention relates to systems and processes for combusting volatile vapors that are remediated or displaced from a storage tank using a combustion engine.

BACKGROUND OF THE INVENTION

Volatile vapors, particularly in the form of hydrocarbons, may be released during soil remediation or by being displaced from a storage tank when the storage tank is otherwise filled with a liquid. One option for eliminating the recovered or displaced hydrocarbon vapors is incorporate them into a fuel or air stream for intake into an internal combustion engine, thereby incorporating the volatile vapors into the fuel/air combustion process. Such an internal combustion engine is disclosed in U.S. Pat. No. 5,424,045, the disclosure of which is incorporated herein by reference in its entirety. While burning volatile in an internal combustion engine can be an effective way of processing the volatile vapors so that they are not released into the atmosphere directly, and control systems have been developed for use with such engines to help them run efficiently, existing control systems generally present only rudimentary information to the operator in the form of very selective raw data about operation of the internal combustion engine. Existing control systems also generally provide only rudimentary scheduling and information about maintenance of the internal combustion engine. Advancements in such control systems are therefore desirable, especially where data concerning operation and maintenance are so vital to the uptime and efficient operation of the overall system. Furthermore, it is desirable to maximize the quantity of volatile vapors that can be burned to reduce reliance on a base fuel source necessary to maintain stable engine operation and to shorten the time required to remediate a site.

SUMMARY OF THE INVENTION

The present invention is directed toward a system and method for combusting volatile vapors using a combustion engine, including a programmable controller for monitoring and controlling the combustion process.

In a first separate aspect of the present invention, a system for combusting volatile vapors includes a carburetor having a first intake valve for receiving fuel from a fuel source, a second intake valve for receiving external air from an external air intake, and a third intake valve for receiving volatile vapors from a vapor source, the carburetor configured to discharge a combustion mixture; a combustion engine operatively coupled to the carburetor to receive the combustion mixture into a combustion chamber; a plurality of sensors configured to generate sensor data based on a respective plurality of physical properties, wherein the plurality of sensors includes a first valve sensor operatively coupled to the first intake valve, a second valve sensor operatively coupled to the second intake valve, and a third valve sensor operatively coupled to the third intake valve, each of the valve sensors being configured to sense a valve position as one of the physical properties; a programmable controller configured to receive the sensor data as input from each of the plurality of sensors and to control the intake valves to regulate respective ratios of the fuel, the external air, and the volatile vapors taken in through the carburetor in response to the received sensor data; and a display operatively coupled to the programmable controller, wherein the programmable controller is configured to display at least a real-time portion of the sensor data on the display as the sensor data is received, the real-time portion of the sensor data including each of the valve positions.

In a second separate aspect of the present invention, a system for combusting volatile vapors includes: a carburetor having a plurality of intake valves for receiving fuel from a fuel source, external air from an external air intake, and volatile vapors from a vapor source, the carburetor configured to discharge a combustion mixture into a combustion chamber of a combustion engine; a plurality of sensors configured to generate sensor data based on a respective plurality of physical properties, wherein the plurality of sensors includes a plurality of valve sensors, each valve sensor operatively coupled to one of the intake valves and configured to sense a valve position as one of the physical properties; a programmable controller configured to receive the sensor data as input from each of the plurality of sensors and to control the intake valves to regulate respective ratios of the fuel, the external air, and the volatile vapors taken in through the carburetor and into the combustion engine in response to the received sensor data; and a display operatively coupled to the programmable controller, wherein the programmable controller is configured to display at least a real-time portion of the sensor data on the display as the sensor data is received.

In a third separate aspect of the present invention, a method for combusting volatile vapors includes: directing the volatile vapors from a vapor source into a combustion engine, wherein a carburetor, comprising a plurality of intake valves for receiving fuel from a fuel source, external air from an external air intake, and the volatile vapors, discharges a combustion mixture into a combustion chamber of the combustion engine; sensing a plurality of physical properties using a plurality of sensors configured to generate sensor data, wherein the plurality of sensors includes a plurality of valve sensors, each valve sensor operatively coupled to one of the intake valves to sense a valve position as one of the physical properties; monitoring the sensor data using a programmable controller; controlling the one or more electronically controlled valves with the programmable controller to regulate respective ratios of the fuel, the external air, and the volatile vapors drawn through the carburetor and into the combustion engine in response to the monitored sensor data; and displaying at least a real-time portion of the sensor data on the display as the sensor data is received, the real-time portion of the sensor data including each of the valve positions.

According to a different aspect of the present invention, an engine loading system automatically controlled by a programmable controller is provided which reduces consumption of a base fuel, increases combustion of volatile vapors in a manner which accounts for fluctuating availability levels of volatile vapor over time from the source, and decreases the time necessary to remediate the source of the volatile vapors.

In one aspect, a system for combusting volatile vapors includes an internal combustion engine; a carburetor operably coupled to the engine, the carburetor having a first intake valve receiving base fuel from a primary fuel source, a second intake valve receiving external air from an external air source, and a third intake valve receiving volatile vapors from a vapor source, the carburetor configured to combine the base fuel, external air, and volatile vapors fuel to form a combustion mixture and discharge the mixture to the engine; an engine loading system operably coupled to the engine and comprising a braking device, the braking device configured to apply an adjustable braking load on the engine; and a programmable controller operably coupled to the braking device and pre-programmed with a plurality of engine braking load levels, the controller configured to: receive real-time engine operating data measured during operation of the engine by a plurality of sensors communicably coupled to the controller; compare the real-time engine operating data against pre-programmed baseline engine operating parameters; and apply a first braking load level on the engine with the braking device based on comparison of the engine operating data to the baseline engine operating parameters for a period of dwell time pre-programmed into the controller.

In another aspect, a system for combusting volatile vapors includes: an internal combustion engine; a carburetor operably coupled to the engine, the carburetor having a first intake valve receiving base fuel from a primary fuel source, a second intake valve receiving external air from an external air source, and a third intake valve receiving volatile vapors from a vapor source, the carburetor configured to combine the base fuel, external air, and volatile vapors fuel to form a combustion mixture and discharge the mixture to the engine; an engine loading system operably coupled to the engine and comprising a braking device, the braking device configured to apply an adjustable braking load on the engine; a plurality of sensors each configured to sense a respective engine operational parameter in real time during operation of the engine, each sensor generating respective real-time engine operating data; and a programmable controller comprising non-transient machine readable media including a pre-programmed plurality of braking load levels and baseline engine operating parameters, each baseline engine operating parameter being associated with a respective sensor; the programmable controller configured to: receive the real-time engine operating data from each of the plurality of sensors; compare the real-time engine operating data for each sensor against its baseline engine operating parameter; and apply a plurality of different braking load levels with the braking device in a progressive stepped manner on the engine, each load level being applied based on comparison of the real-time engine operating data for each sensor against its baseline engine operating parameter; wherein each load level is maintained at a constant braking force by the programmable controller for a pre-programmed period of dwell time before switching to a next successively higher or lower load level.

A method for combusting volatile vapors is provided. The method includes: mixing in a carburetor base fuel from a base fuel source, external air from an external air source, and volatile vapors from a vapor source defining a combustion mixture; burning the combustion mixture in an internal combustion engine having a rotating crankshaft; sensing a plurality of physical properties associated with operation of the engine using a plurality of sensors configured to generate sensor data comprising real-time engine operating data measured by the sensors; monitoring the sensor data using a programmable controller including a plurality of preprogrammed engine braking load levels; the programmable controller comparing the sensor data against baseline engine operating parameters preprogrammed into a non-transient storage media accessible to the programmable controller; the programmable controller applying a first braking load level on the engine with a braking device operably coupled to the engine crankshaft based on the comparison of the sensor data to the baseline engine operating parameters; and the programmable controller maintaining the first braking load level on the engine at a constant value for a dwell time preprogrammed into the programmable controller.

Accordingly, an improved system and method for combusting volatile vapors are disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 11 is a screenshot showing a parts checklist page for display by a programmable controller for a combustion engine;

DETAILED DESCRIPTION OF THE INVENTION

Figure 1:
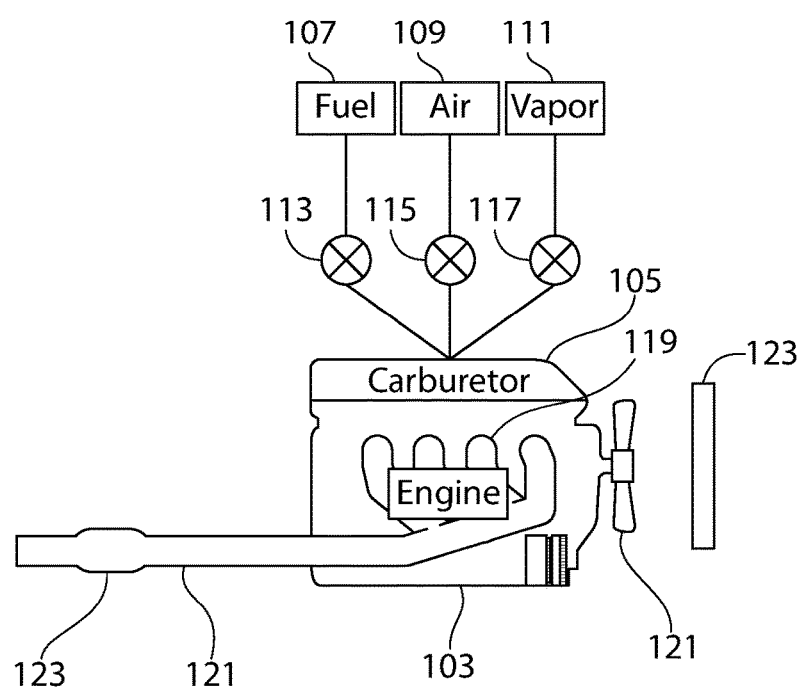
FIG. 1 is schematic diagram of a first carburetor having three valves to control air and fuel intakes.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Turning in detail to the drawings, FIG. 1 schematically illustrates a system 101 for burning volatile vapors, the system 101 including an internal combustion engine 103, the associated carburetor 105, the sources 107, 109, 111, and the intake valves 113, 115, 117 controlling the flow from each of the sources 107, 109, 111. Much of the internal combustion engine 103 operates in a manner well-known to those of skill in the art, wherein the internal combustion engine 103 receives a combustion mixture, which includes fuel, external air, and volatile vapors for the system 101, from the carburetor 105 and ignites the combustion mixture within a combustion chamber 119.

The intake valves 113, 115, 117, although shown external to the carburetor 105, may be incorporated into the carburetor 105. The first intake valve 113 controls flow of fuel from the first source 107, which is a fuel source, such as a fuel tank. The second intake valve 115 controls flow of external air from the second source 109, which is an external air source. The third intake valve 117 controls flow of volatile vapors from the third source 111, which is a volatile vapor source, which may be a tank for holding liquid hydrocarbons, or another source such as soil remediation. Each of the three intake valves 113, 115, 117 may be of different design and construction from the other valves to accommodate the type of matter being taken into the carburetor 105.

The internal combustion engine 103, like most internal combustion engines, includes a fan 121, a radiator 123, both being part of a cooling system, an exhaust 121, through which the products of combustion leave the internal combustion chamber 119, and a catalytic converter 123 is positioned inline with the exhaust 121.

Figure 2:
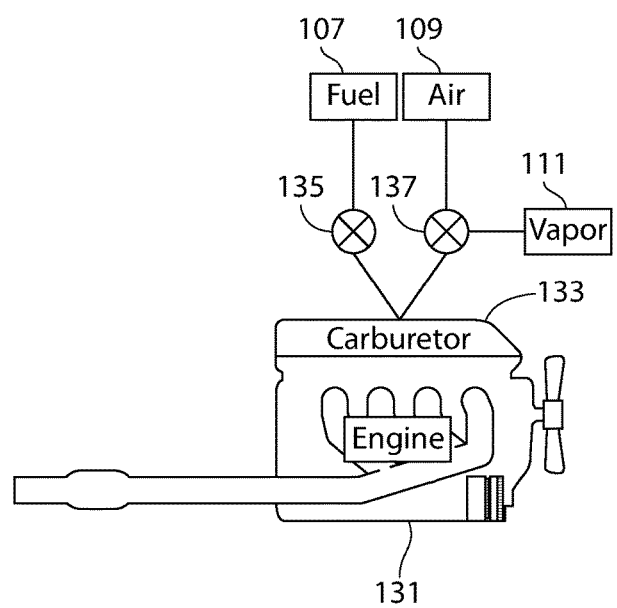
FIG. 2 is a schematic diagram of a second carburetor having two valves to control air and fuel intakes.

An internal combustion engine 131 with an alternative intake valve configuration is shown in FIG. 2. This alternative configuration includes a carburetor 133 and two intake valves 135, 137. The first intake valve 135 controls flow of fuel from the first source 107, which is a fuel source. The second intake valve 137 controls both the flow of external air from the second source 109, which is an external air source, and the flow of volatile vapors from the third source 111, which is a volatile vapor source. The second intake valve 137 combines the external air and the volatile vapors into a single stream that is drawn into the carburetor 133. As before, the intake valves 135, 137 are shown external to the carburetor 133, but may be incorporated into the carburetor 105. Other configurations of the intake valves and the sources may also be used, such as having a single intake valve for controlling a combination of the fuel and the volatile vapors, among others.

Figure 3:
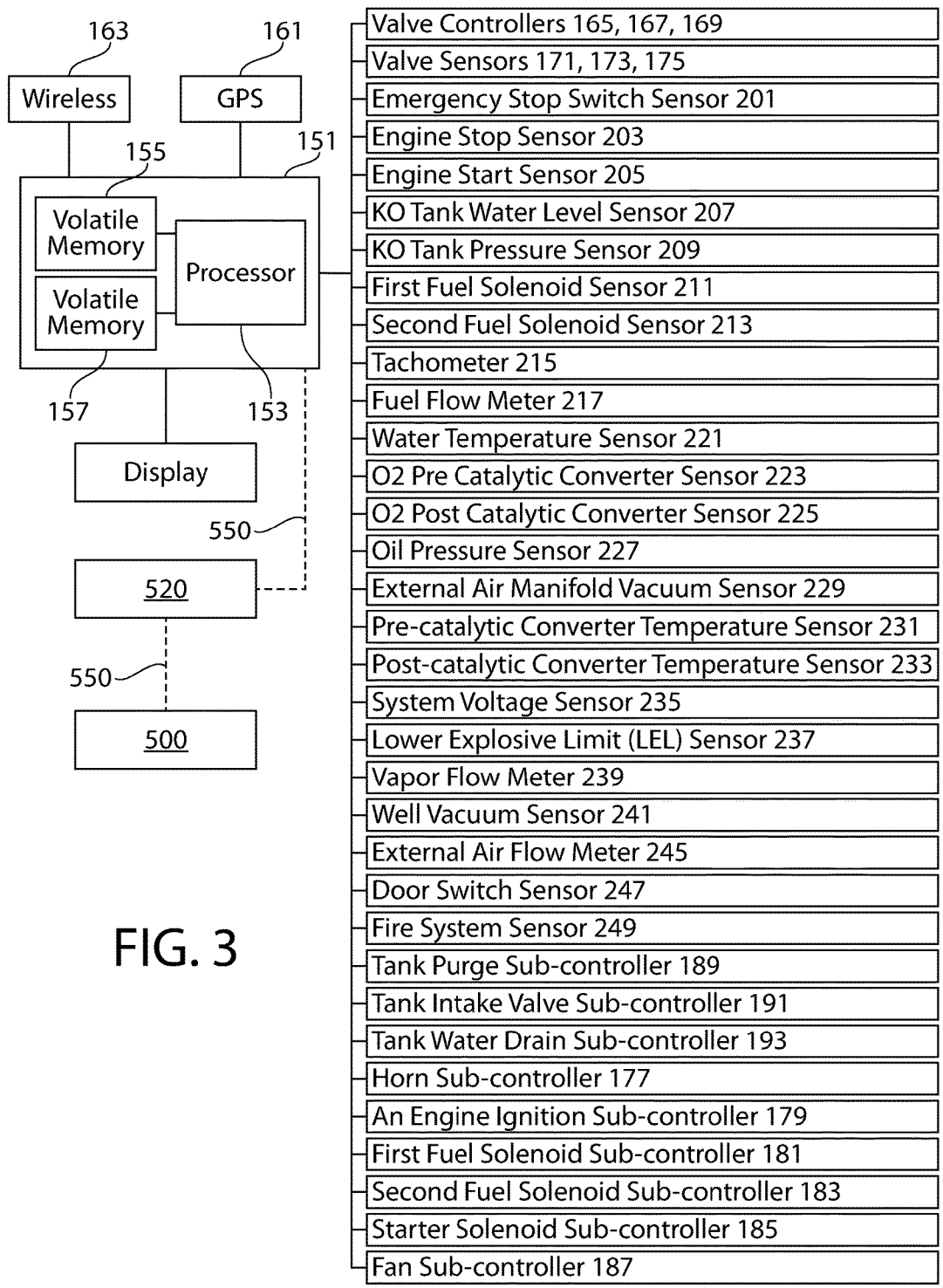
FIG. 3 is a schematic diagram of a programmable controller and associated sensors for a combustion engine.

A programmable controller 151 for controlling the combustion engine and managing the burning of the volatile vapors is shown in FIG. 3. The programmable controller 151 includes a programmable processor 153, a volatile memory 155, and non-volatile memory 157. The non-volatile memory 157 may be a removable memory, such as a removable hard drive, a removable SD card, and the like. Both the volatile memory 155 and the non-volatile memory 157 are used for saving sensor data received by the programmable controller 151, for storing programming, and storing operating parameters associated with operation of the internal combustion engine 131. The programmable controller 151 is communicably coupled to a main display 159, a geolocation module 161, and a wireless communication module 163. The geolocation module 161 generates a geolocation signal, which identifies the geolocation of the internal combustion engine (to which the programmable controller is attached), and communicates the geolocation signal to the programmable controller 151. The wireless communication module 163 enables the programmable controller 151 to communicate wirelessly with other devices directly and/or over a wide area network. Display 159 forms a single Human Machine Interface (HMI) for the entire system including the normal production process control system and the optional engine loading system further describe herein. The display 159 may be a touch sensitive display for facilitating interaction with an operator. In some embodiments, the programmable controller 151 may communicate wirelessly with the display 159. In certain embodiments, the display 159 may be omitted, as the programmable processor 153 may communicate with a remote programmable unit wirelessly using the wireless communication module 163 and use a display included with the remote unit for displaying the sensor data.

The programmable controller 151 is also electronically connected to control mechanisms and sensors which enable the programmable controller 151, and an operator, to monitor and control operation of the internal combustion engine for burning the volatile vapors. The various sensors are positioned in and around the system and configured to generate sensor data based on monitored physical properties associated with the system. The sensor data generated by each sensor is communicated to the programmable controller, whether in raw form or following processing of raw sensor data by a sub-controller (such as an analog-to-digital converter) to generate a representation of the sensor data. The measured physical properties may vary, and the type of sensor employed depends upon the type of physical property being monitored.

The programmable controller 151 is communicably coupled to three valve sub-controllers 165, 167, 169, each of which is coupled to one of the three intake valves, respectively, for variably controlling the position of the respective intake valve by applying a voltage within an operational range of voltages for each respective valve sub-controller. In other embodiments, however, the functionality of separate sub-controllers may be combined into a single sub-controller 165/167/169 which is configured to control the positions of each intake valve 113, 115, and 117 separately from the single module. Accordingly, three discrete sub-controllers need not be provided in every embodiment. Additionally, the programmable controller 151 is able to sense the voltage being applied to each of the valve sub-controllers. Any one or more of the valve sub-controllers 165, 167, 169 may be incorporated into the programmable controller 151, or any one or all of the valve sub-controllers 165, 167, 169 may be housed and located separately from the programmable controller 151. The programmable controller 151 is also communicably coupled to three valve sensors 171, 173, 175, each of which is positioned near one of the three intake valves, respectively, so that the programmable controller 151 may sense, through the three valve sensors 171, 173, 175, the position of each of the three intake valves. The three valve sensors 171, 173, 175 may communicate an analog signal to the programmable controller 151, or alternatively, the analog signal from one or more of the three valve sensors 171, 173, 175 may be converted into a digital signal by an appropriate analog-to-digital converter, with the resulting digital signal being communicated to the programmable controller 151.

The programmable controller 151 is communicably coupled to additional sub-controllers associated with the internal combustion engine, any of which may be incorporated into the programmable controller 151: a horn sub-controller 177; an engine ignition sub-controller 179; a first fuel solenoid sub-controller 181; a second fuel solenoid sub-controller 183; a starter solenoid sub-controller 185; and an external air manifold sub-controller 187. These sub-controllers, including the valve sub-controllers 165, 167, 169, enable the programmable controller 151 to exert control over nearly all operational aspects of the internal combustion engine. Where desired, for a particular sub-controller, the programmable controller 151 may apply a variable actuating signal, and the programmable controller 151 may be configured to sense the voltage (or current) being applied to any of the sub-controllers.

The horn sub-controller 177 enables the programmable controller 151 to have control over a horn (not shown) associated with the internal combustion engine, with the horn serving to provide a localized audible alert signal. The engine ignition sub-controller 179 enables the programmable controller 151 to have start and stop control for the internal combustion engine. The first fuel solenoid sub-controller 181 and the second fuel solenoid sub-controller 183 enables the programmable controller 151 to actuate two fuel solenoids (not shown), so that the programmable controller 151 may shut off the flow of fuel from the fuel source. The starter solenoid sub-controller 185 enables the programmable controller 151 to have actuating control over the starter (not shown) for the internal combustion engine. The combination of the engine ignition sub-controller 179 and the starter solenoid sub-controller 185 provide the programmable controller with the ability to control the start-up process for the internal combustion engine. The external air manifold sub-controller 187 enables the programmable controller 151 to variably control the rate at which external air is drawn into the system, the external air being directed to the air intake valve.

The programmable controller 151 is also communicably coupled to sub-controllers associated with a vapor source, and where the vapor source is a tank (commonly called a "knockout tank" or "KO tank", or more generally, the "well") these sub-controllers include: a tank purge sub-controller 189; a tank intake valve sub-controller 191; and a tank water drain sub-controller 193. The tank purge sub-controller 189 enables the programmable controller 151 to actuate a tank purge valve (not shown). The tank intake valve sub-controller 191 enables the programmable controller 151 to actuate a tank intake valve (not shown). The tank water drain sub-controller 193 enables the programmable controller 151 to actuate a tank water drain valve (not shown). These sub-controllers enable the programmable controller 151 to exert control over important operational aspects of a knockout tank. Where desired, for a particular tank sub-controller, the programmable controller 151 may apply a variable actuating signal, and the programmable controller 151 may be configured to sense the voltage (or current) being applied to any of the tank sub-controllers.

The programmable controller 151 is communicably coupled to and receives digital signal input from the following sensors: an emergency stop switch sensor 201; an engine stop sensor 203; an engine start sensor 205; a KO tank water level sensor 207; a KO tank pressure sensor 209; a first fuel solenoid sensor 211; a second fuel solenoid sensor 213; a tachometer 215; and a fuel flow meter 217. The programmable controller 151 is communicably coupled to and receives analog signal input from the following sensors: a water temperature sensor 221; an $O_2$ pre catalytic converter sensor 223; an $O_2$ post catalytic converter sensor 225; an oil pressure sensor 227; an external air manifold vacuum sensor 229; a pre catalytic converter temperature sensor 231; a post catalytic converter temperature sensor 233; a system voltage sensor 235; an lower explosive limit (LEL) sensor 237; a vapor flow meter 239; a well vacuum sensor 241; an external air flow meter 245; a door switch sensor 247; and a fire system sensor 249. The analog signal from any one or more of the included analog sensors may be converted into a digital signal by an appropriate analog-to-digital converter, with the resulting digital signal being communicated to the programmable controller 151.

The emergency stop switch sensor 201 enables the programmable controller 151 to monitor an emergency stop switch (not shown), so that when the emergency stop switch is actuated by an operator, the programmable controller 151 takes all programmed actions for an emergency shut down of the internal combustion engine. The engine stop switch may be an analog switch, which outputs a digital signal, or a digital switch that is represented on the display. The engine stop sensor 203 enables the programmable controller 151 to monitor an engine stop switch (not shown), so that when the engine stop switch is actuated, the programmable controller 151 takes all programmed actions for an orderly shut down of the internal combustion engine. The engine start sensor 205 enables the programmable controller 151 to monitor an engine start switch (not shown), so that when the engine start switch is actuated, the programmable controller 151 takes all programmed actions for an orderly start up of the internal combustion engine. Either or both of the engine stop switch and the engine start switch may be an analog switch, which outputs a digital signal, or a digital switch which is represented on the display.

The KO tank water level sensor 207 enables the programmable controller 151 to monitor a water level within the KO tank. The KO tank pressure sensor 209 enables the programmable controller 151 to monitor a pressure within the KO tank. The well vacuum sensor 241 enables the programmable controller 151 to monitor a vacuum state of the KO tank. The vapor flow meter 239 enables the programmable controller 151 to monitor a flow of volatile vapors from the KO tank.

The first fuel solenoid sensor 211 enables the programmable controller 151 to monitor the position of the first fuel solenoid, and the second fuel solenoid sensor 213 enables the programmable controller 151 to monitor the position of the second fuel solenoid. The fuel flow meter 217 enables the programmable controller 151 to monitor a the flow of fuel, such as propane, from the fuel source to the carburetor. The programmable controller 151 may be programmed to convert the signal received from the fuel flow meter 217 into cubic feet per minute (CFM). The external air flow meter 245 enables the programmable controller 151 to monitor the flow of external air from the external air source (e.g., the external air manifold) to the carburetor. The programmable controller 151 may be programmed to convert the signal received from the external air flow meter 217 into CFM.

The tachometer 215 enables the programmable controller 151 to monitor the rotation rate of the internal combustion engine, thereby measuring the revolutions per minute (RPM). The oil pressure sensor 227 enables the programmable controller 151 to monitor an oil pressure of the internal combustion engine. The external air manifold vacuum sensor 229 enables the programmable controller 151 to monitor the vacuum pressure of the internal external air intake. The water temperature sensor 221 enables the programmable controller 151 to monitor the temperature of water within the cooling system of the internal combustion engine. The $O_2$ pre catalytic converter sensor 223 enables the programmable controller 151 to monitor the oxygen level in the exhaust from the internal combustion engine prior to the exhaust passing through the catalytic converter, and likewise, the pre catalytic converter temperature sensor 231 enables the programmable controller 151 to monitor the temperature of the exhaust from the internal combustion engine prior to the exhaust passing through the catalytic converter. Similarly, the $O_2$ post catalytic converter sensor 225 enables the programmable controller 151 to monitor the oxygen level in the exhaust from the internal combustion engine after the exhaust has passed through the catalytic converter, and the post catalytic converter temperature sensor 233 enables the programmable controller 151 to monitor the temperature of the exhaust from the internal combustion engine after the exhaust has passed through the catalytic converter. In other possible embodiments, the post catalytic sensor may be omitted and the programmable controller 151 only monitors pre-catalytic O2 levels to control operation of the system.

The system voltage sensor 235 enables the programmable controller 151 to monitor the operating voltage supplied to the programmable controller 151. The LEL sensor 237 enables the programmable controller 151 to monitor the levels combustible vapors (from the KO tank, the fuel source, or elsewhere) accumulated within the interior of an engine enclosure housing the internal combustion engine. Sufficiently high levels of such combustible vapors will trigger the programmable controller 151 to initiate an appropriate shut down procedure. The door switch sensor 247 enables the programmable controller 151 to monitor whether an access door for the engine enclosure is open or closed. The fire system sensor 249 enables the programmable controller 151 to monitor a fire suppression system included within engine enclosure. Activation of the fire suppression system will trigger the programmable controller 151 to initiate an appropriate shut down procedure.

Figure 4:
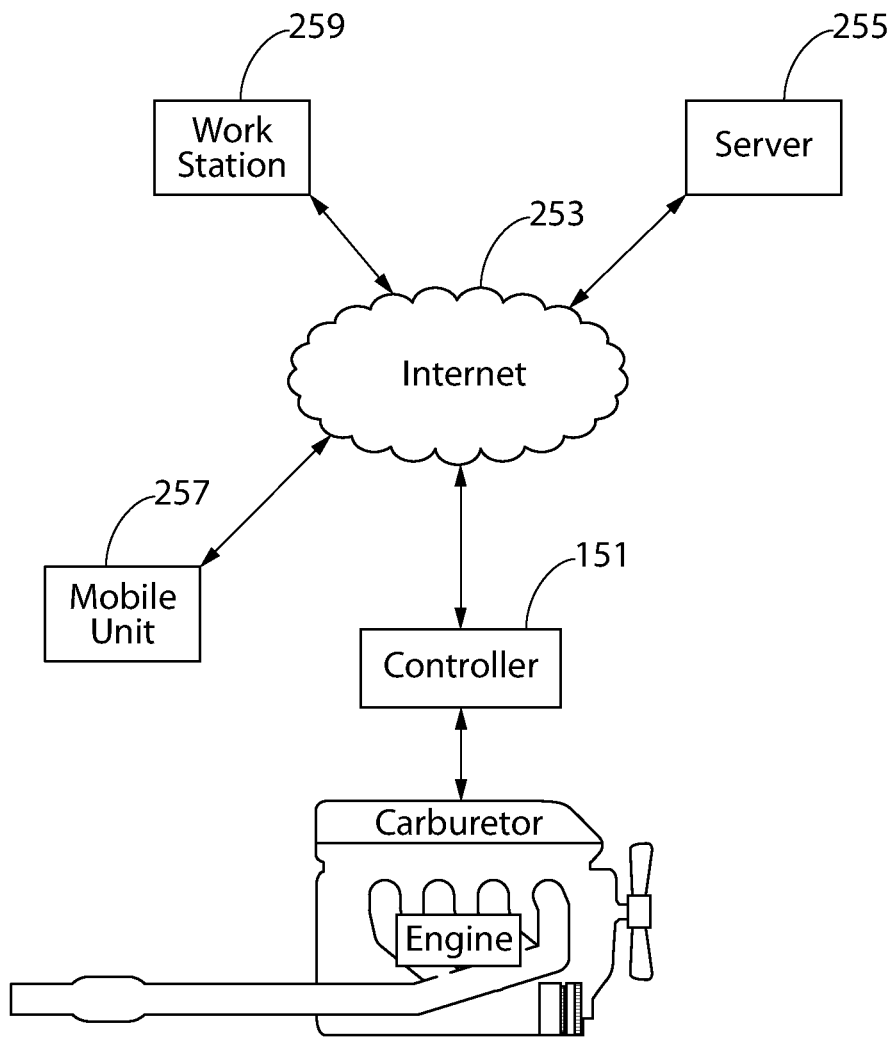
FIG. 4 is a schematic diagram of a network incorporating a programmable controller for a combustion engine.

The programmable controller 151 is shown as part of a system 251 in a network environment in FIG. 4. The network environment may include and operate over a wide area network, which may be public network such as the Internet 253. Alternatively, the wide area network may be a private network or any combination of public and private networks. The networks themselves may be wired networks, wireless networks, or any combination of wired and wireless networks. Using the network, the programmable controller 151 may communicate with any of a server 255, a remote programmable unit 257, and a remote workstation 259. Login identifiers and passwords may be established for operators to better secure access to the programmable controller 151 from unwanted network intrusions when the network used is at least partially public. The remote programmable unit 257 may be any of a smart phone, a tablet computer, a laptop computer, and the like. The remote workstation 259 may be a desktop computer or other similar device. In the system 251, only one of each type of device is shown for simplicity, while those of skill in the art will recognize that any number of remote programmable units, workstations, servers, and programmable controllers may be included as part of the overall system.

The programmable controller 151 may communicate sensor data to any of the server 255, the remote programmable unit 257, and the remote workstation 259, and the programmable controller 151 may receive control data from any of the server 255, the remote programmable unit 257, and the remote workstation 259. The remote programmable unit 257 and the remote workstation 259 may be programmed with the same interactive programming described herein for the programmable controller 151, so that an operator of the remote programmable unit 257 and the remote workstation 259 may interact with the programmable controller 151, along with the sensors and sub-controllers with which the programmable controller 151 communicates, in the same manner as if the operator was using a display, as shown in FIG. 3, to interact with the programmable controller 151. When interacting and communicating with the programmable controller 151, the remote programmable unit 257 and the remote workstation 259 receives sensor data from the programmable controller 151 and may send control data to the programmable controller 151. The control data sent to the programmable controller is the same type of settings and parameters data that may be entered by an operator directly on a display connected to the programmable controller, as shown in FIG. 3 and discussed in greater detail below.

As another feature, the programmable controller 151 may communicate with the server 255 to establish a database in which the sensor data may be saved for future reference and analysis. Once the database is established by the server 255, according to instructions provided by the programmable controller 151, the programmable controller 151 communicates sensor data to the server 255, and the server 255 appends the received sensor data to the database. The database may take any form or format desired, and may be in the form of an SQL database.

Figure 5:
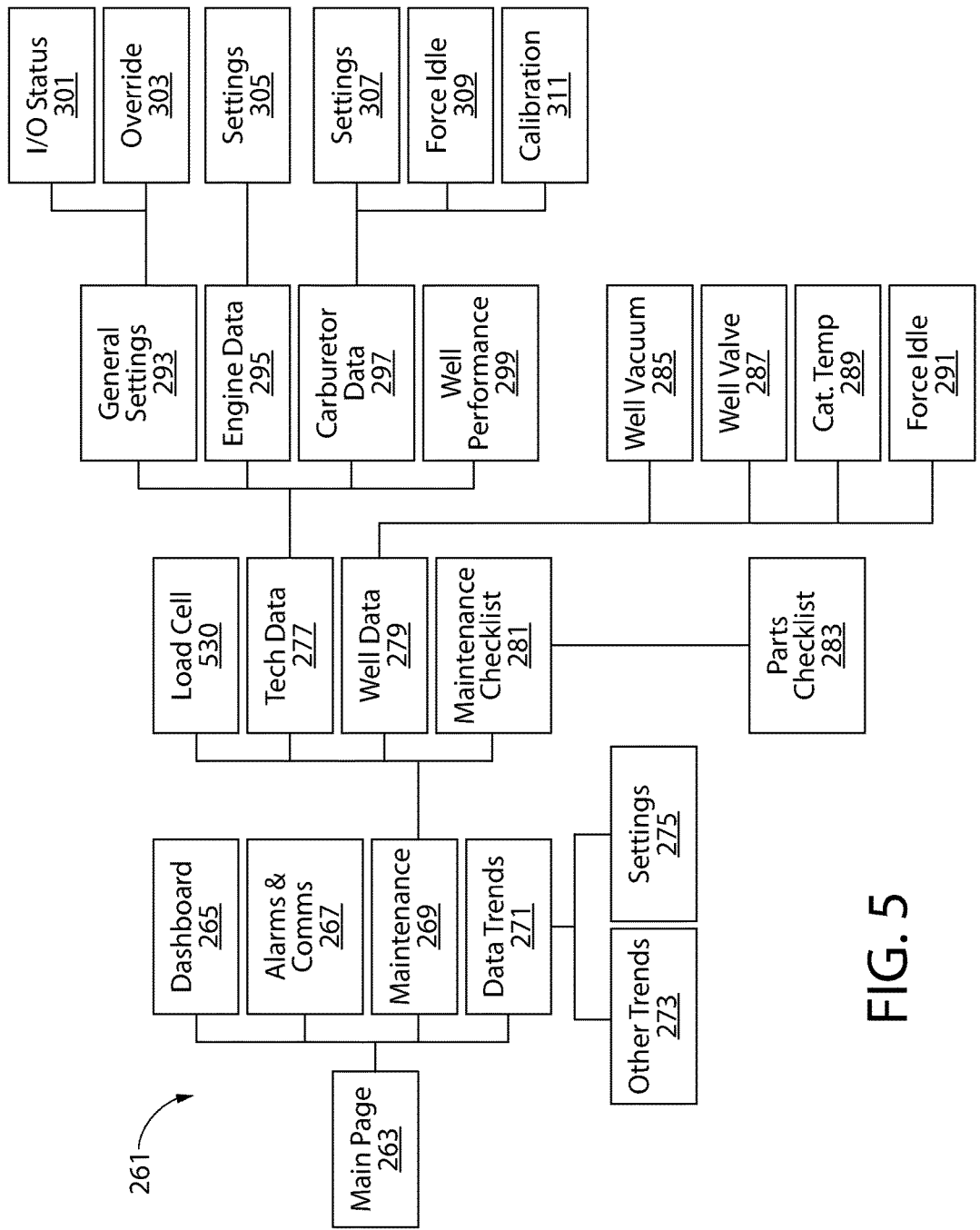
FIG. 5 is a diagram showing a hierarchical structure of pages for display by a programmable controller for a combustion engine.

A hierarchical structure of pages 261 for display by the programmable controller on the display is shown in FIG. 5. Navigation between the different pages may be achieved by employing a touch-sensitive display and providing active regions, identified by graphical objects, on the touch-sensitive display for the operator to move through the hierarchical structure of pages 261. A navigation area may be represented by a panel on the display which enable the operator to traverse up and down the hierarchy. In addition, a graphical object may be an active region and leads to a page which enables the operator to input parameters associated with the feature represented by the graphical object and/or leads to a page where further information about the feature represented by the graphical object.

When the operator is presented with a page on which parameters may be entered or changed, an appropriate numerical or alphabetical virtual key pad is shown on the display. When an operator wants to make a change to an adjustable parameter, an allowable range for adjusting the parameter is shown on the display. If the operator attempts to adjust the parameter out of the given range, a message indicating that the entered parameter is out of the allowed range is shown on the display.

The main or home page 263 of the hierarchical structure of pages 261 is the default page that is shown when the programmable controller is initially accessed by an operator. The home page 263 shows the time, date, and total run hours for the internal combustion engine. The home page 263 may also include additional information, such as a job number, a unit number, and a serial number for the internal combustion engine. At least part of the home page 263 shows the current operational status by changing background colors. When the background is a first color, such as white, it signifies the system is in idle mode and all sensor data indicates that there are no issues that need to be addressed by the operator. When the background color is a second color, such as green, it signifies that the internal combustion engine is in production mode and there are no issues that need to be addressed by the operator. When the background is a third color, such as red, it signifies that an alarm or warning has been triggered and attention is needed by the operator. In certain embodiments, an operator may need to enter an identifier and/or a password prior to navigating beyond the home page 263. In addition, operators may be assigned a tech level, with at least two levels being assignable. The lower tech level, referred to as "tech level 1," may have limited access to certain parts of the programmable controller, and the higher tech level, referred to as "tech level 2," has full access to the programmable controller.

From the home page 263, the operator may navigate to a dashboard page 265, an alarms and communications page 267, a maintenance page 269, and a data trends page 271. The data trends page 271 leads to additional data trends pages 273 and to a trends settings page 275. The maintenance page 269 leads to a tech page 277, a well data page 279, and a service checklist page 281. The service checklist page 281 leads to a parts checklist page 283. The well data page 279 leads to a well vacuum settings page 285, a well valve settings page 287, a catalytic converter temperature settings page 289, and to a force idle page 291. The tech page 277 leads to a general settings page 293, an engine data page 295, a carburetor data page 297, and a well performance page 299. The general settings page 293 leads to an input/output status page 301 and an override page 303, and the engine page 295 leads to an engine settings page 305. The carburetor page 297 leads to a carburetor settings page 307, a force idle page 309, and a carburetor calibration page 311.

Figure 6:
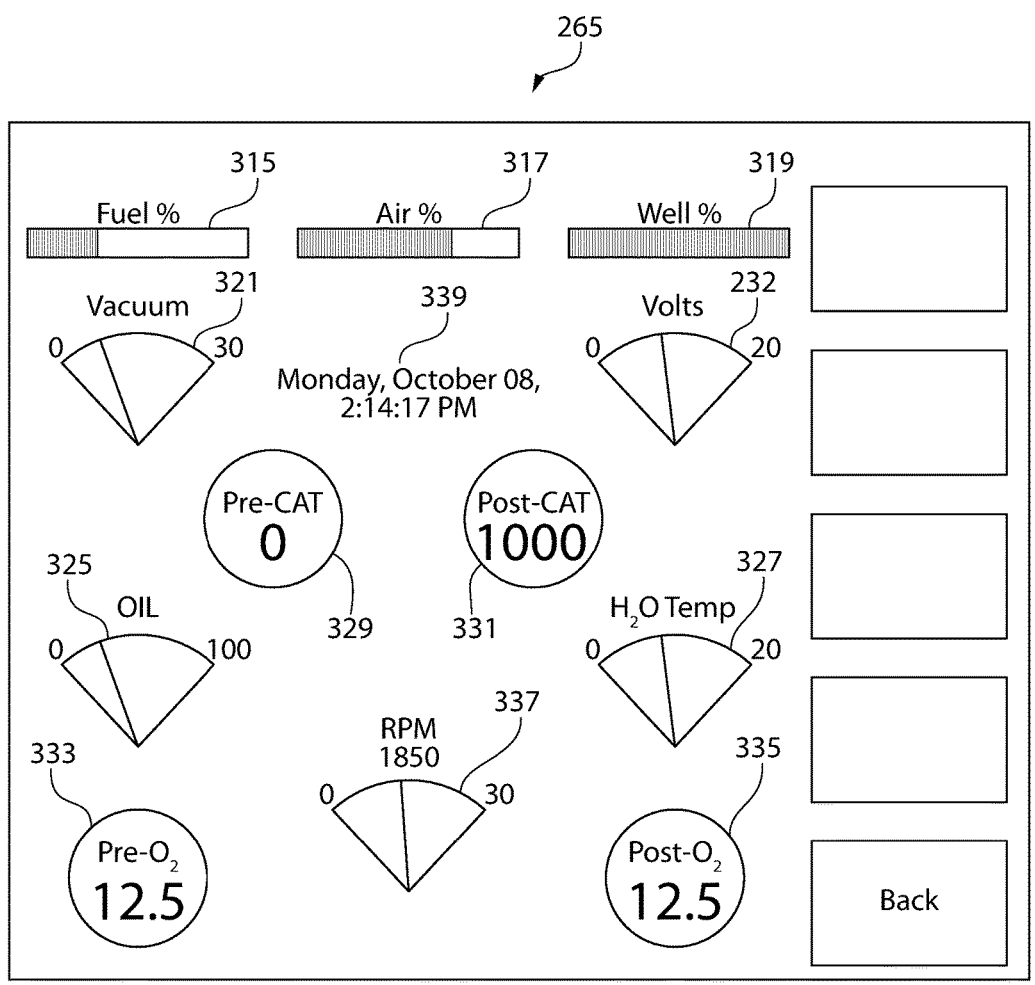
FIG. 6 is a screenshot showing a dashboard page for display by a programmable controller for a combustion engine.

An exemplary dashboard page 265 is shown in FIG. 6. The dashboard page 265 is a summary page which shows real time performance and status data associated with the overall system. In an exemplary embodiment, the dashboard page 265 shows: the amount the fuel intake valve for the carburetor is open 315, as a percentage open; the amount the external air intake valve for the carburetor is open 317, as a percentage open; the amount the volatile vapor intake valve for the carburetor is open 319, as a percentage open; the external air manifold vacuum level 321, the system operating voltage 323, the engine oil pressure 325, the engine water temperature 327, the pre-catalytic converter exhaust temperature 329, the post-catalytic converter exhaust temperature 331, the pre-catalytic converter exhaust $O_2$ level 333, the post-catalytic converter exhaust $O_2$ level 335, the engine RPM 337, and the current date and time 339. When the data displayed is associated with a maximum or minimum range entered by the operator, the dashboard page 265 will show the graphical representation of the data in a first color, such as green, when the particular real-time sensor data is within the set range, and it will show the graphical representation of the data in a second color, such as red, when the particular real-time sensor data is outside of the set range. Other types of data may be included on the dashboard page 265 based on design choice.

Figure 7:
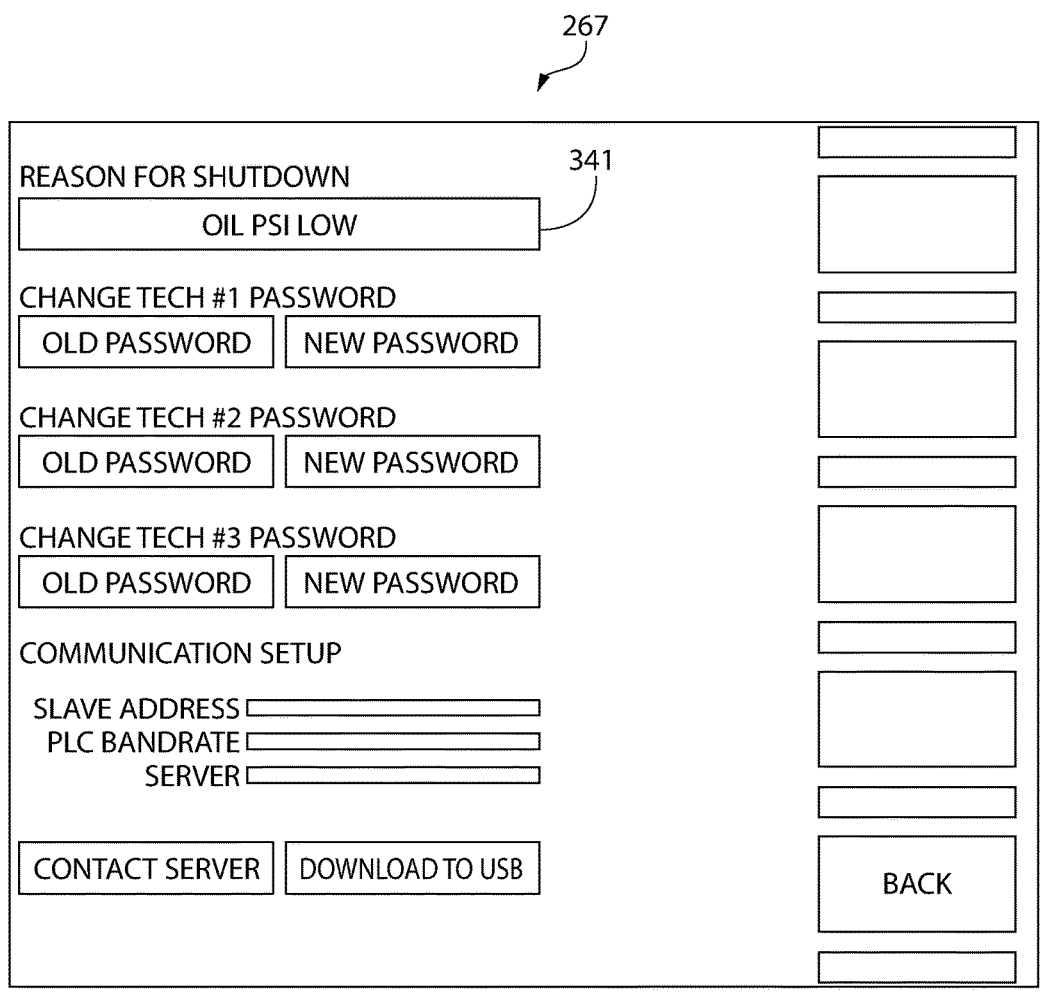
FIG. 7 is a screenshot showing an alarms and communications page for display by a programmable controller for a combustion engine.

An exemplary alarms and communications page 267 is shown in FIG. 7. The alarms and communications page 267 shows a list of active faults and alarms 341 in a prominent position near the top of the page, with the alarms listed in chronological order. Alarms remain in the list until cleared by the operator, with an active region being provided for the operator to clear an alarm. The alarms and communications page 267 also enables passwords to be set for operators, and it provides the operator with configuration access for establishing communications with a server, including set-up and management of the database once communications with the server are established. The alarm and communications page 267 may also give the operator an option to download all stored data into a non-volatile memory via a USB port that may be included with the programmable controller.

Figure 8:
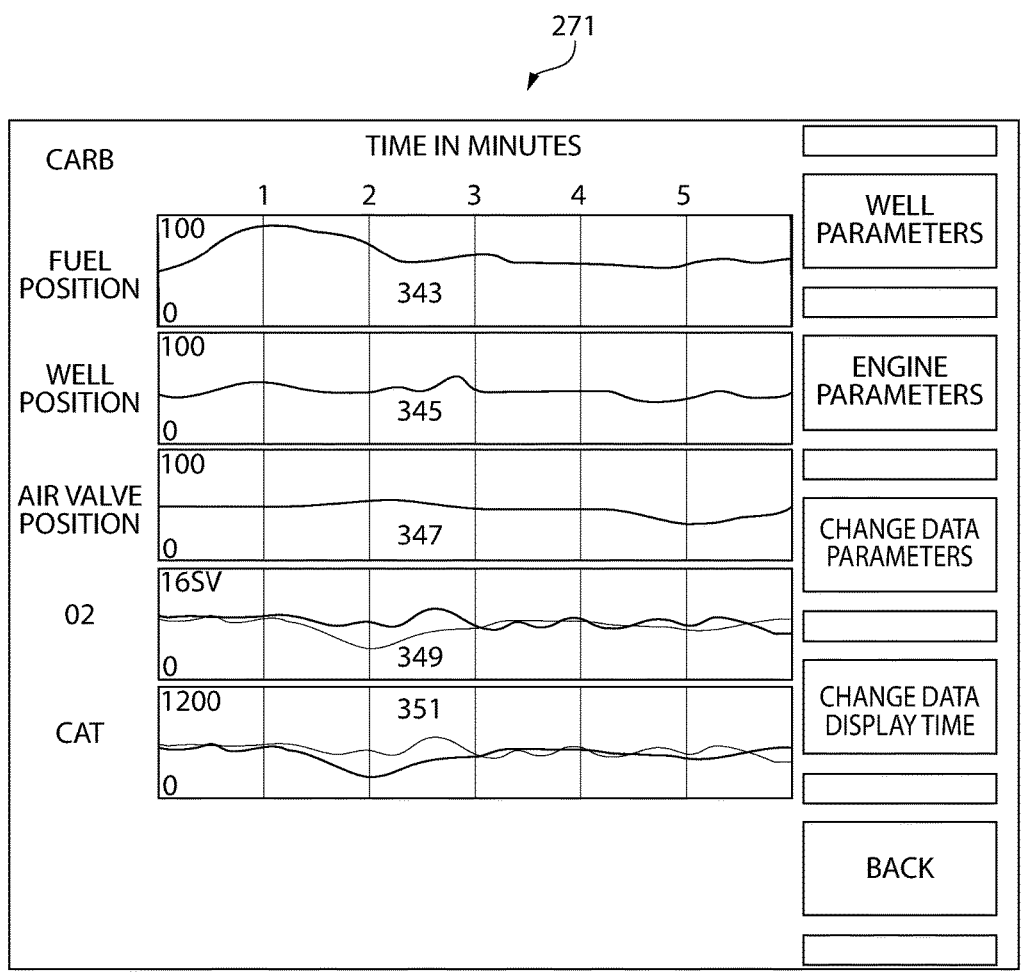
FIG. 8 is a screenshot showing a data trends page for display by a programmable controller for a combustion engine.

An exemplary data trends page 271 is shown in FIG. 8. The data trends page 271 shows the real-time and historical sensor data for a select number of the sensors in a graph format. For example, the trends data page 271 may show the real-time sensor data along with six minutes of historical data. Carburetor trend sensor data is shown in FIG. 8, and this data includes the position of the three intake valves 343, 345, 347, along with the pre- and post-catalytic converter exhaust $O_2$ levels 349 (two lines shown on a single graph) and the pre- and post-catalytic converter exhaust temperatures 351 (two lines shown on a single graph). Active regions are included so that the operator may switch to trends associated with the internal combustion engine and with the well by selecting. Sensor data that may be shown with the engine trend sensor data includes engine oil temperature, engine water temperature, external air manifold vacuum, and pre- and post-catalytic converter exhaust $O_2$ levels, and pre- and post-catalytic converter exhaust temperatures. Sensor data that may be shown with the well trend sensor data includes the CFM intake from the well, the parts per million (PPM) of hydrocarbons in the well intake, the calculated BTU's of the hydrocarbons burned by the internal combustion engine, the well vacuum pressure, and the external air manifold vacuum pressure. Other sensor data may be included in any of the trend pages. The amount of historical sensor data displayed may be set by the user, as is the amount of historical data stored by the programmable controller. Both these parameters may be set in the trends settings page 275 by the operator entering the desired values for each parameter.

The trends data can be valuable when performing maintenance on the system. For example, the operator may be able to tell from the trends data if the engine performance has changed gradually over time, resulting in an alarm being triggered from the sensor data associated with one of the sensors going beyond the maximum or minimum preset values, or if the sensor data has become erratic, thereby exceeding one of the preset values and being indicative of a failing sensor. In each instance, the action taken by the operator to perform maintenance will be significantly different. In the former case, the operator may need to perform an overall service of the internal combustion engine, and in the latter case, the operator may need to do nothing more than replace the failing sensor.

Figure 9:
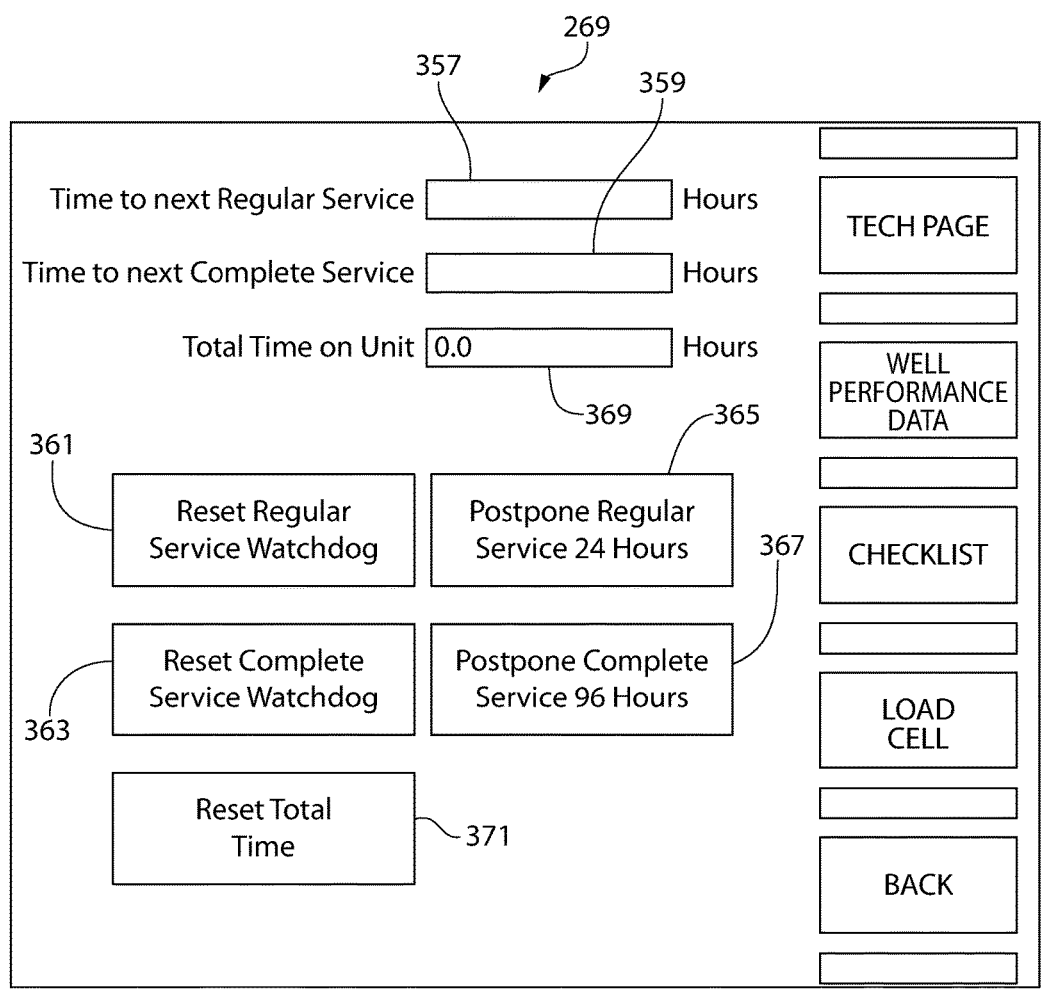
FIG. 9 is a screenshot showing a maintenance page for display by a programmable controller for a combustion engine.

An exemplary maintenance page 269 is shown in FIG. 9. The maintenance page 269 shows two different countdown timers 357, 359, with the first countdown timer 357 counting down the time until the next 100-hour general service of the internal combustion engine, and the second countdown timer 359 counting down the time until the next 1000-hour general service of the internal combustion engine. Each countdown timer 357, 359 shows remaining time until the next service interval and the appropriate reset and delay options. A reset button 361, 363 and a delay button 365, 367 are included for each countdown timer 357, 359. The reset buttons 361, 363 reset the respective timers, while the delay buttons 365, 367 serve to postpone the alarm associated with each countdown timer 357, 359. Preferably, each countdown timer 357, 359 may only be postponed for a limited time before a fault is entered that can only be cleared by performing the designated maintenance. The total operating time of the internal combustion engine 369 is also displayed and tracked, and a button is provided to reset the total operating time 371.

The programmable controller also tracks certain events associated with maintenance of the system. The tracked items may include: when the regular service countdown timer is reset; when the regular service fault is postponed; when the complete service countdown timer is reset; when the complete service fault is postponed; when the total time on the unit is reset; when the regular service countdown timer expires; and when the complete service countdown timer expires.

Figure 10:
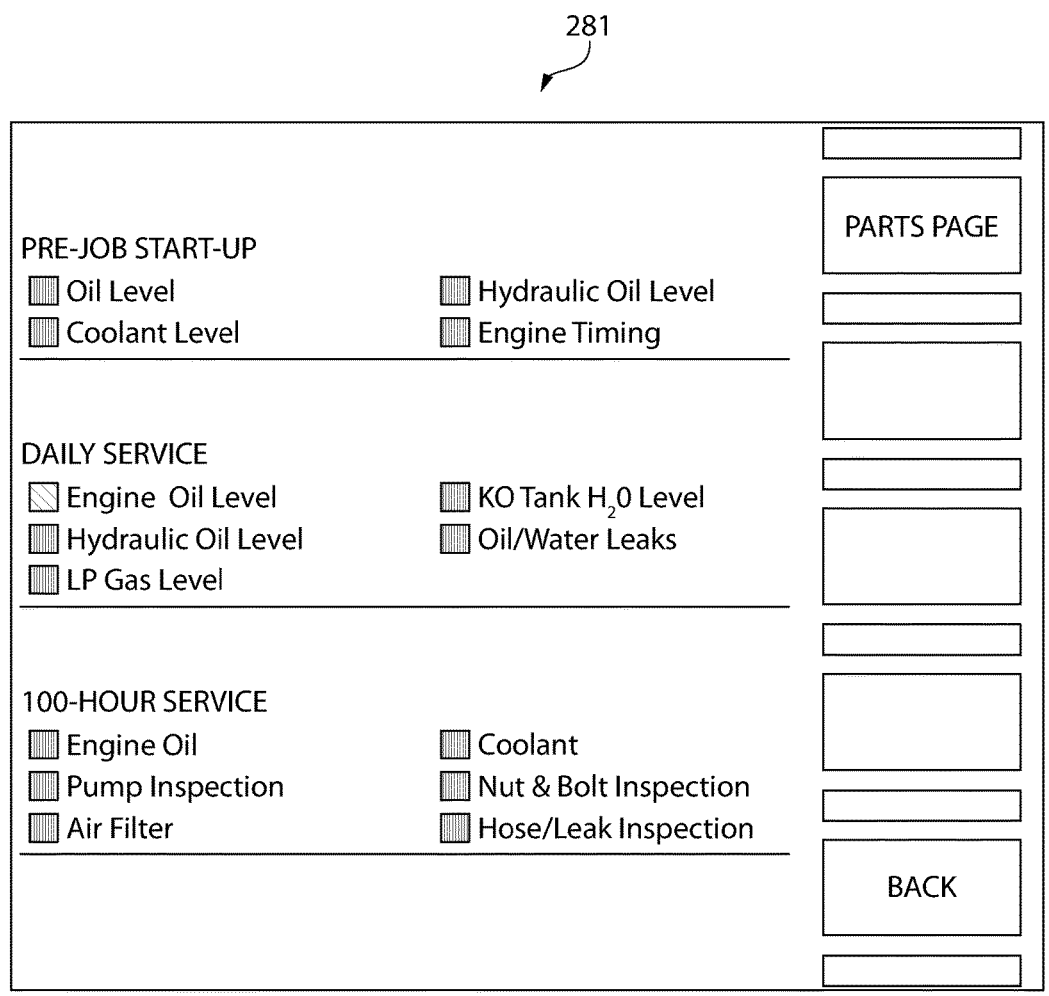
FIG. 10 is a screenshot showing a service checklist page for display by a programmable controller for a combustion engine.

An exemplary service checklist page 281 is shown in FIG. 10. This page enables an operator to check a service item to indicate that the service has been performed. When an item changes status from un-checked to checked (i.e., not yet serviced to serviced), the programmable controller tracks the event when the operator leaves the service checklist page 281. An exemplary parts checklist page 283 is shown in FIG. 11. This page enables an operator to check a parts item to indicate that the part has been serviced (e.g., the required maintenance on that part has been performed, or the part has been replaced). When an item changes status from un-checked to checked (i.e., not yet serviced to serviced), the programmable controller tracks the event when the operator leaves the service checklist page 281 (not when the operator leaves the parts checklist page 283). The parts checklist page may apply to individual parts of the internal combustion engine, or it may apply to sub-systems of the engine. The types of service items and parts items included on each of the service checklist page 281 and the parts checklist page 283 may vary based upon design choice.

Figure 12:
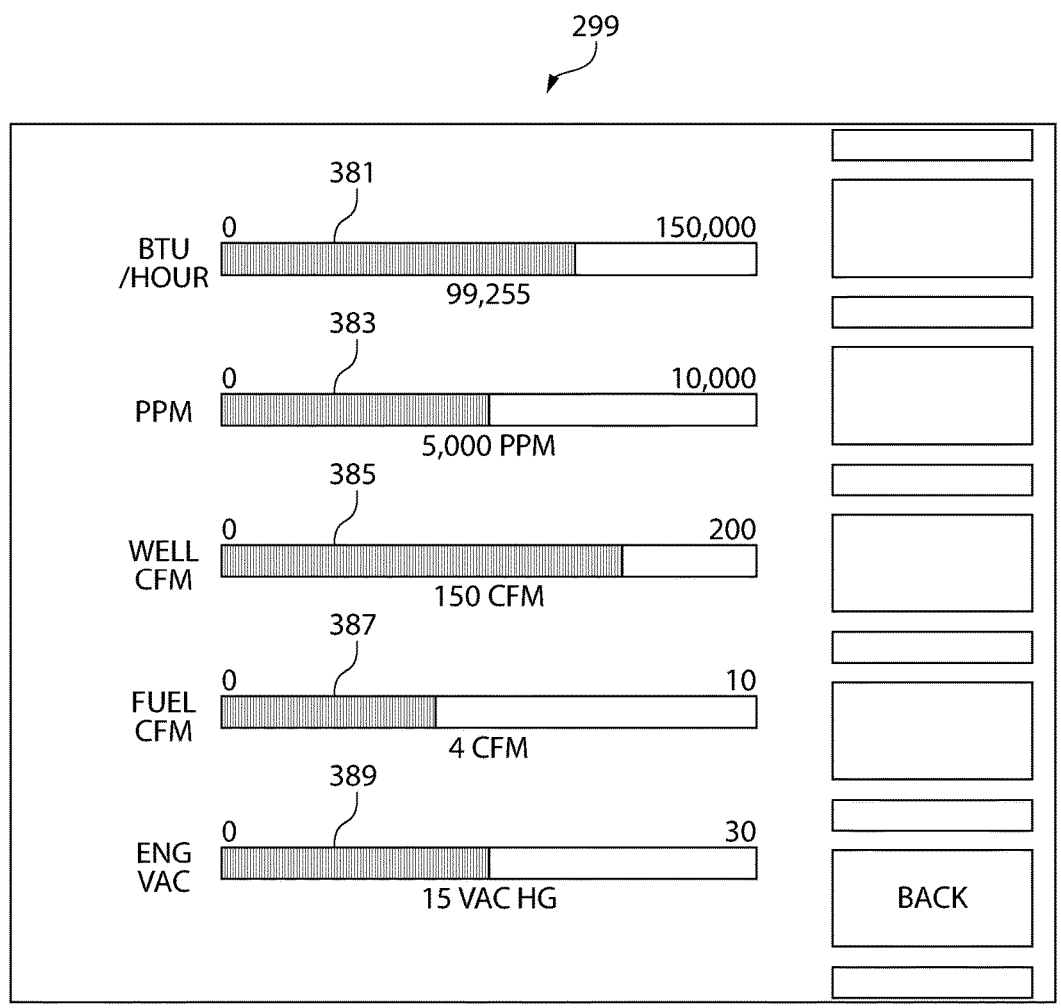
FIG. 12 is a screenshot showing a well performance page for display by a programmable controller for a combustion engine.

An exemplary well performance page 299 is shown in FIG. 12. The well performance page 299 serves as a quick reference to data associated with the well or data that is associated with the burn rate of the volatile vapors from the well. As shown, the well performance page 299 includes simple graphs showing the calculated BTUs per hour 381 generated by burning the volatile vapors from the well; the parts per million of hydrocarbons 383 included in the volatile vapors from the well; the CFM of volatile vapors 385 from the well; the CFM of fuel from the fuel source 387; and the external air manifold vacuum level 389. Other data may be included as desired on the well performance page 299.

Figure 13:
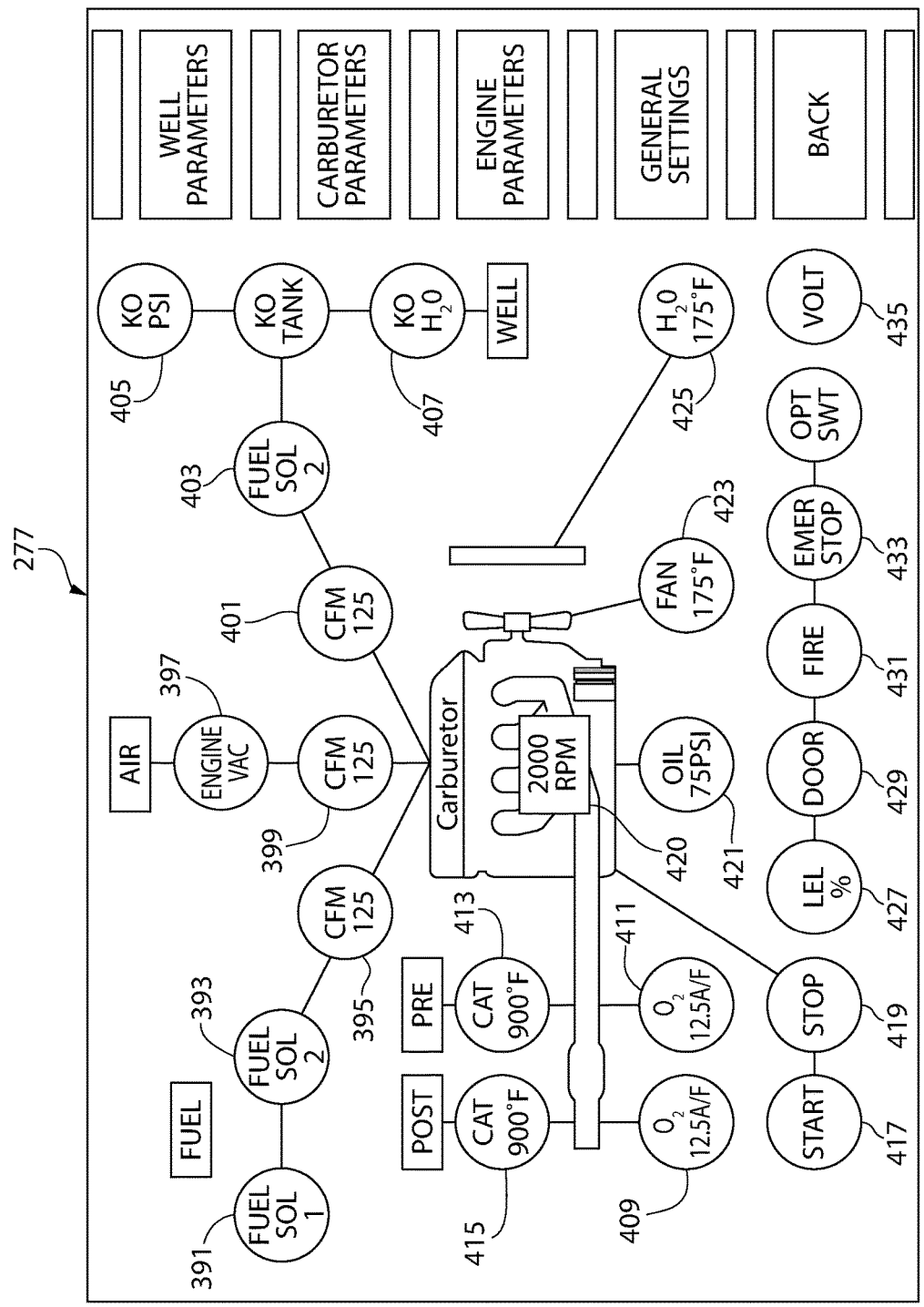
FIG. 13 is a screenshot showing a system technician data page for display by a programmable controller for a combustion engine.

An exemplary tech data page 277 is shown in FIG. 13. The tech data page 277 gives real time readings of the fuel system, engine, and well conditions. In addition, there may be two versions of the tech data page 277, with both having the same appearance, and the difference being that on one tech page the operator is limited in the changes that can be made to the parameters shown, and in the other tech page the operator may change the parameters without limit. The difference is determined by tech level assigned to the operator logging into the programmable controller. Tech level 1 operators may be limited to changing a performance parameter by no more than 25% of that value for the performance parameter as set by a tech level 2 operator. Other restrictions may be applied to tech level 1 operators, as desired.

The tech data page 277 includes the following real-time sensor data and color indicators showing whether the sensor data displayed is within a desired operating range: the status of the first fuel solenoid 391 (off or on); the status of the second fuel solenoid 393 (off or on); the fuel flow rate 395; the external air manifold vacuum 397; the external air flow rate 399; the volatile vapor flow rate 401 from the well; the well vacuum 403; the KO tank purge valve status 405; the KO tank water drain valve status 407; the pre- and post-catalytic converter exhaust $O_2$ levels 409, 411; the pre- and post-catalytic converter exhaust temperatures 413, 415; the engine start switch status 417; the engine stop switch status 419; the engine RPM 420; the engine oil pressure 421; the engine fan status 423; the engine water temperature 425; the LEL percentage 427 in the engine enclosure; the engine enclosure door status 429; the fire suppression system status 431; the emergency engine stop status 433; and the system voltage 435. For certain of the sensor data displayed, it is also desirable to include a third color indicator to visually show when the sensor data has passed a predetermined warning limit, this warning limit being outside of the desired operating range. The sensors for which it may be desirable to have this third color indicator include at least all engine exhaust sensors, the well flow rate and well vacuum sensors, all external air-related sensors, and all fuel-related sensors.

Each graphical object of the various sensor data shown on the tech data page 277 is an active region and leads to a page which enables the operator to input parameters associated each respective sensor. The parameters may serve to establish a predetermined limit, which may be an upper, a lower, or both, for the associated sensor. In the event that the predetermined limit is reached during operation, the programmable controller will take a predetermined action, also identified by the operator, which may include one or more of setting a fault alert, communicating the alert with a server, a remote unit, and/or a workstation, sounding an audible alert with the horn, and shutting down operation of the internal combustion engine, among other possible actions.

Figure 14:
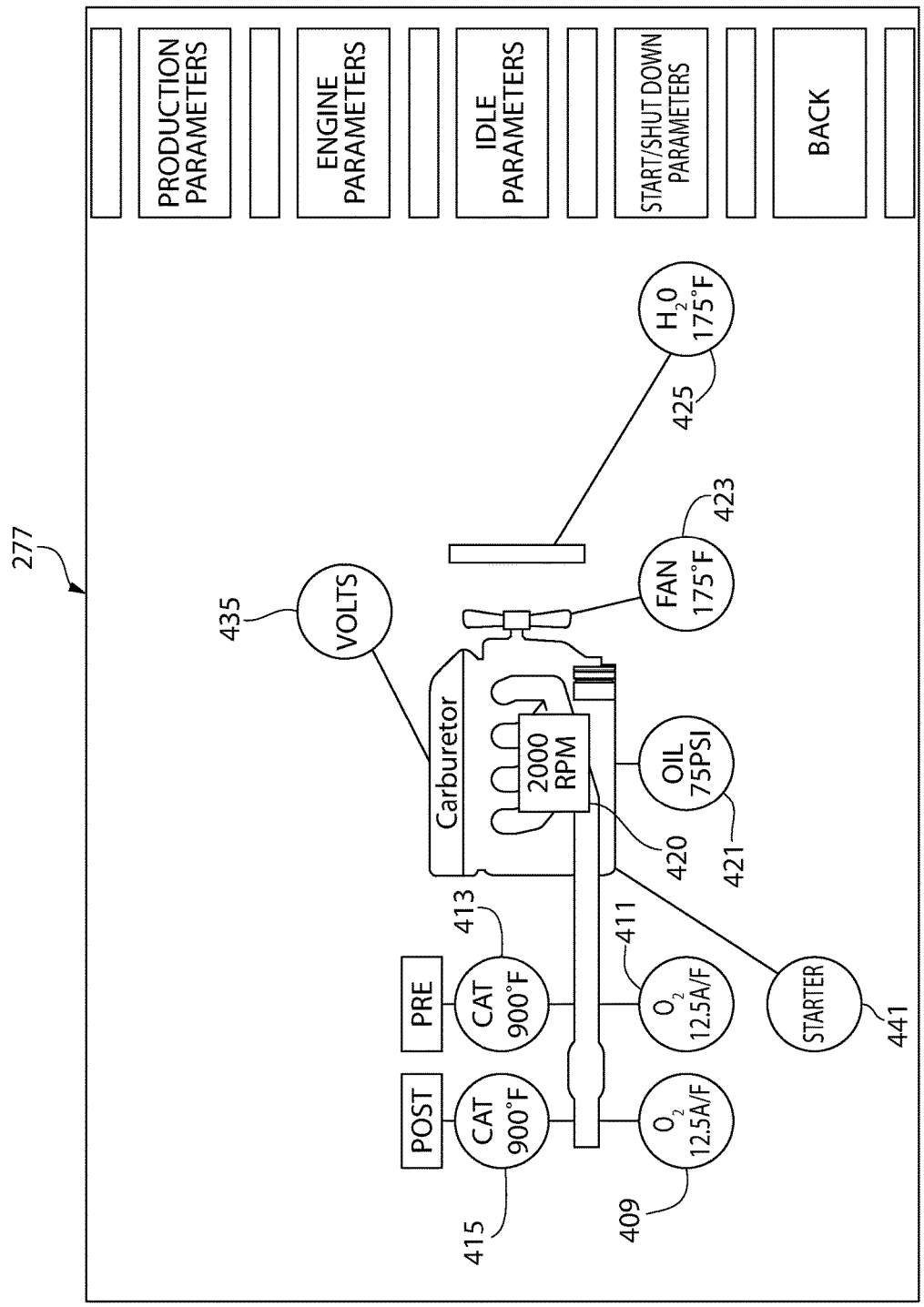
FIG. 14 is a screenshot showing an engine data page for display by a programmable controller for a combustion engine.

An exemplary engine data page 295 is shown in FIG. 14. The engine data page 295 shows the current engine status, and it includes the following real-time sensor data and color indicators showing whether the sensor data displayed is within a desired operating range: the pre- and post-catalytic converter exhaust $O_2$ levels 409, 411; the pre- and post-catalytic converter exhaust temperatures 413, 415; the engine starter status 441; the engine RPM 420; the engine oil pressure 421; the engine fan status 423; the engine water temperature 425; and the system voltage 435. For certain of the sensor data displayed, it is also desirable to include a third color indicator to visually show when the sensor data has passed a predetermined warning limit, this warning limit being outside of the desired operating range. The sensors for which it may be desirable to have this third color indicator include all engine exhaust sensors, the engine oil pressure, the engine water temperature, and the system voltage.

The settings page 305 associated with the engine may be a single page or the settings options may be divided across several pages. The settings options associated with the engine include production parameters, engine parameters, engine idle parameters, and startup and shutdown parameters. The production parameters may include the minimum exhaust temperatures pre- and post-catalytic converter during operation, along with a minimum operating engine temperature and the desired operating RPM for the internal combustion engine. The engine parameters may include a maximum difference between the pre- and post-catalytic converter $O_2$ levels, the minimum oil pressure, the engine temperature at which the fan is actuated on, the minimum RPM for a standard shutdown procedure, the engine temperature warning level, and an $O_2$ control loop setpoint. The idle parameters may include an idle mode threshold, an idle mode duration timer, and an idle mode RPM for the internal combustion engine. The startup and shutdown parameters may include an engine stop delay timer, a set number of attempts for an automatic restart, a time delay between a shutdown and a restart, the LEL shutdown level, and a LEL delay timer to set the restart time delay after an LEL shutdown event.

Figure 15:
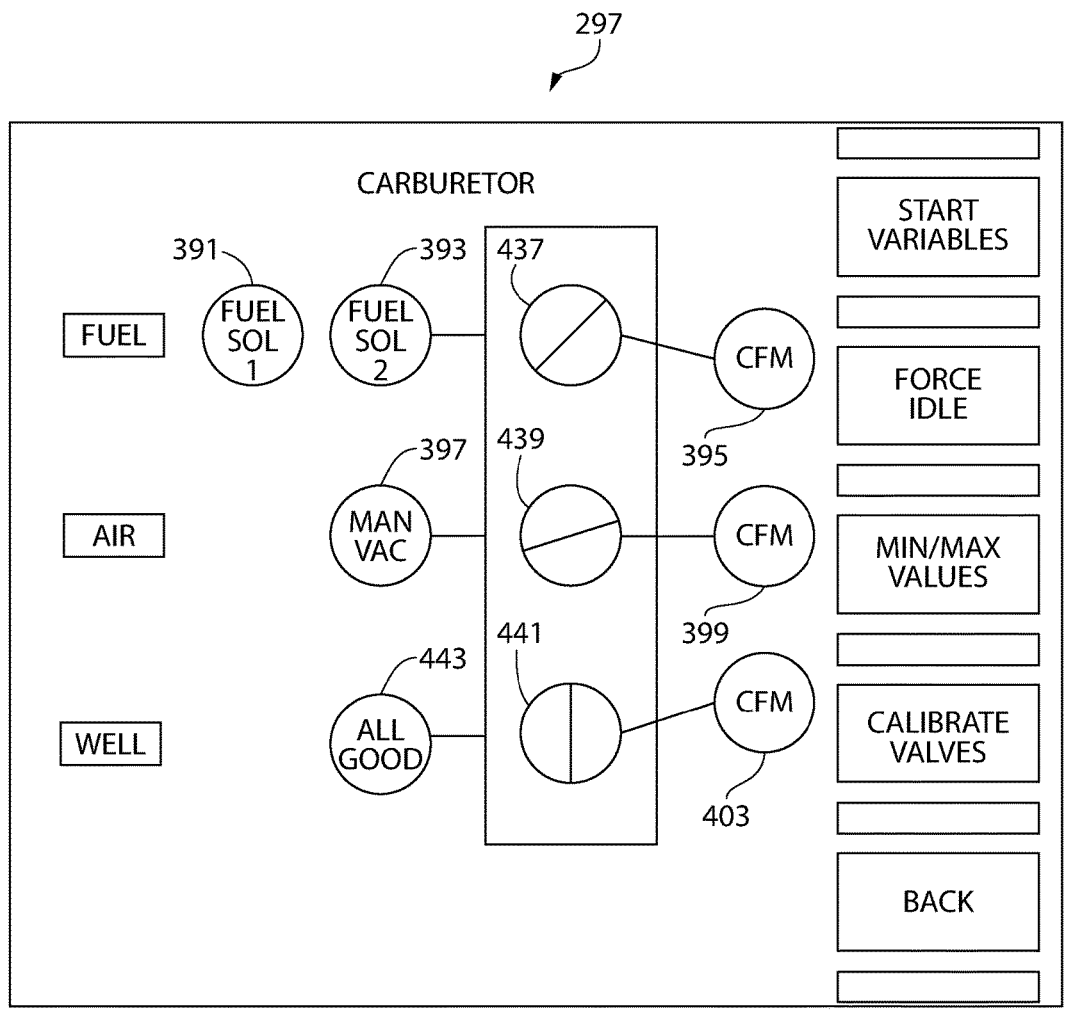
FIG. 15 is a screenshot showing a carburetor data page for display by a programmable controller for a combustion engine.

An exemplary carburetor data page 297 is shown in FIG. 15. The carburetor data page 297 shows the current positions of the three intake valves 437, 439, 441 as well as the current carburetor status. The carburetor data page 297 includes the following real-time sensor data and color indicators showing whether the sensor data displayed is within a desired operating range: the status of the first fuel solenoid 391 (off or on); the status of the second fuel solenoid 393 (off or on); the fuel flow rate 395; the external air manifold vacuum 397; the external air flow rate 399; the volatile vapor flow rate 401 from the well; and a general status indicator for the well 443 showing if the well is in a "good" condition or if sensor data associated with the well is out of range. For certain of the sensor data displayed, it is also desirable to include a third color indicator to visually show when the sensor data has passed a predetermined warning limit, this warning limit being outside of the desired operating range. The sensors for which it may be desirable to have this third color indicator on the carburetor data page 297 include the flow rate of the fuel, external air, and volatile vapors and the external air manifold vacuum pressure.

The settings page 307 associated with the carburetor may be a single page or the settings options may be divided across several pages. The settings options associated with the carburetor include start variable settings and maximum/minimum valve settings. In addition, the carburetor page 297 may link the force idle page, discussed above, and a calibration page for the intake valves. The start variable settings page may include initial settings for the fuel intake valve and the air intake valve at startup of the internal combustion engine. These initial valve settings may be expressed as a percentage open, with 0% being fully closed and 100% being fully open. The maximum/minimum valve settings page enables the operator to set the minimum and maximum valve opening parameters for each of the fuel intake valve, the external air intake valve, and the volatile vapor intake valve.

On the valve calibration page in FIG. 15, the operator may manually actuate any of the intake valves to a designated opening, again expressed as a percentage open, and the programmable controller displays both the sensor data from the valve sensor associated with the manually actuated valve, as a percentage open, and the voltage applied to the valve to achieve the manually entered parameter. The operator may then compare the valve operation with known technical specifications for the valve to determine if the valve is in need of cleaning or being replaced. In alternative embodiments, the same procedure may be performed on other valves or solenoids incorporated into the system.

Figure 16:
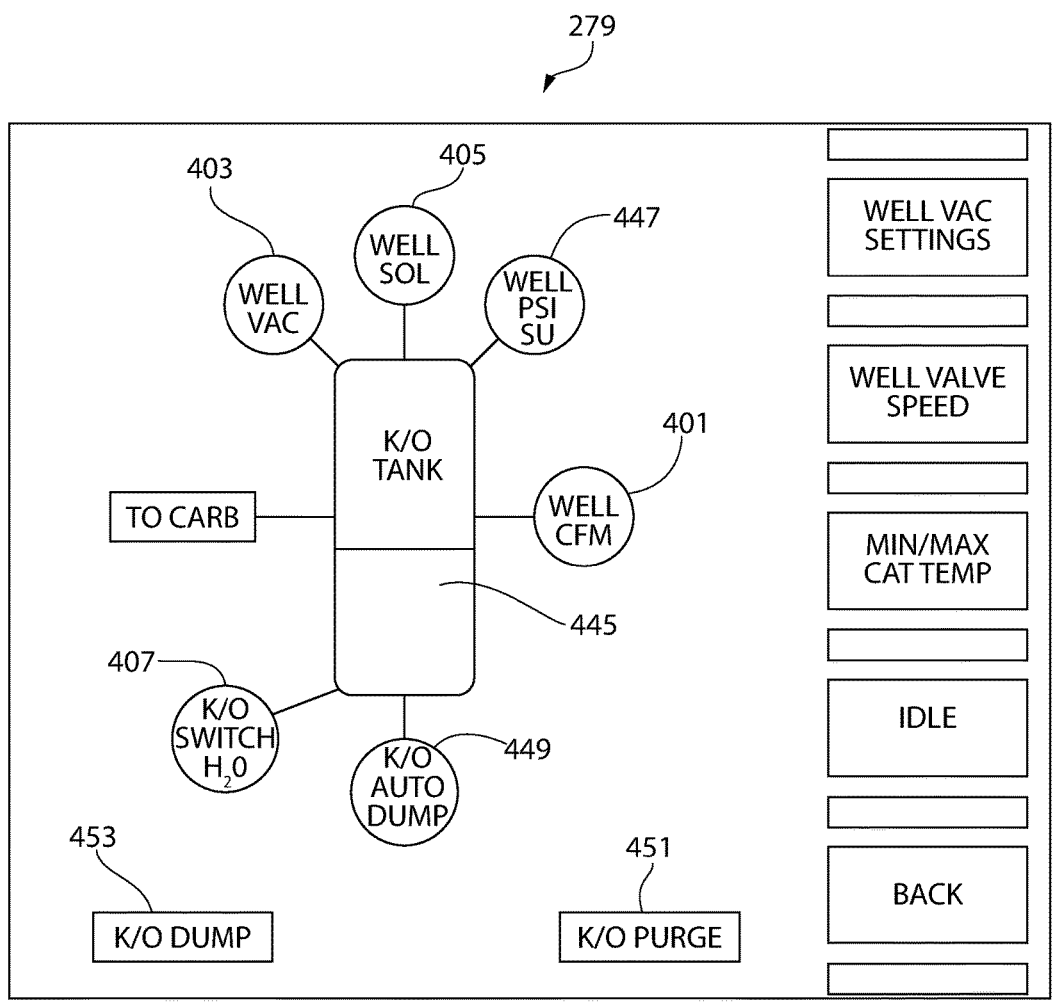
FIG. 16 is a screenshot showing a well data page for display by a programmable controller for a combustion engine.

An exemplary well data page 279 is shown in FIG. 16. The well data page 279 includes the following real-time sensor data and color indicators showing whether the sensor data displayed is within a desired operating range: the volatile vapor flow rate 401 from the well; the well vacuum 403; the KO tank purge valve status 405; the KO tank water drain valve status 407; the well intake sensor 445; the well purge sensor 447; and the well water drain sensor 449. The well data page 279 also includes graphical buttons 451, 453 as active regions for the operator to actuate the KO tank purge valve and the tank water drain valve.

From the well data page 279, the operator may navigate to the well vacuum settings page 285, the well valve settings page 287, the catalytic converter temperature settings page 289, and to the force idle page 291. On the well vacuum settings page 285, the minimum and maximum well vacuum parameters may be set by the operator. On the well valve settings page, the operator may adjust the gain/time for opening up the well intake valve following startup of the internal combustion engine. On the catalytic converter temperature settings page 289, the operator may set the pre- and post-catalytic converter exhaust temperature warning parameter and the well lean temperature parameter.

Although not depicted, the general settings page 293 is a page on which the operator may enter general settings and parameters for the system. These parameters may include the job number, the unit number, and the serial number for the internal combustion engine. The input/output status page 301 shows the current condition of all the digital inputs, digital outputs, and analog inputs for the programmable controller, along with the real-time sensor data associated with each input. The override page 303 enables the operator to override any of the digital inputs, digital outputs, and analog inputs for the programmable controller. Manually overriding one of the inputs or outputs can be helpful for troubleshooting a bad wire, sensor, solenoid, and switch. In certain embodiments, the override page 303 is only available to an operator who is a tech level 2.

Artificial Engine Loading System

One goal of internal combustion engine based volatile vapor elimination or remediation systems of the type disclosed herein is to maximize the consumption of the vapors. Accordingly, it is desirable to burn a majority of volatile vapors in the engine from the supplementary vapor source 111 when available rather than fuel from primary base fuel source 107 (e.g. liquid or gaseous fuel) used to stabilize engine operation, and most desirable to burn solely volatile vapors in certain operational circumstances provided stable engine operation can be maintained within designated operating or production parameters. The amount or volume of volatile vapors that can be consumed by the engine, however, is limited by and directly related to the load imposed on the engine at any given time in addition to the available supply of volatile vapors. If the engine is required to perform more work, consumption of volatile vapors is possible to more quickly remediate an environmental cleanup site or equipment which may contain volatile vapors (e.g. fuel storage tank farms).

According to another aspect of the invention therefore, an artificial engine loading system is provided which operates to artificially increase the load on the engine crankshaft, thereby making the engine do more work and increasing consumption of volatile vapors from the vapor source. The term "artificial" is used to connote and distinguish between a separate load imposed on the engine solely for the purpose of increasing volatile vapor burn in contrast to any normal engine operating loads which might include loads imposed by operating auxiliary or ancillary apparatuses off of the engine crankshaft whether they be mechanical devices (e.g. fans, pumps, etc.) and/or electrical devices such as electric generators for producing on-site or on-board power. The engine loading system is usable with any of the system configurations disclosed herein for combusting volatile vapors and augments such systems to improve their capacity for burning and eliminating the vapors. In one implementation, the artificial load may be a braking load or force applied to the engine crankshaft by an engine braking device as further described herein.

Figure 17:
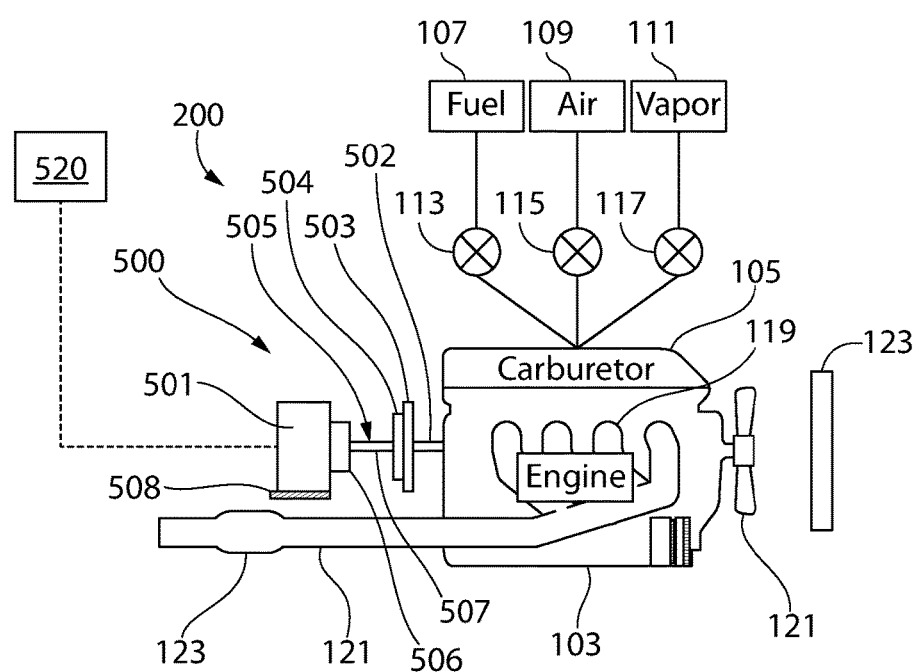
FIG. 17 is a schematic diagram of the engine of FIG. 1 for combusting volatile vapors which includes an engine loading system for imposing artificial braking loads on the engine to maximize consumption of volatile vapors.

Stable operation of the engine typically cannot usually be maintained on merely the vapor source alone due to fluctuating levels of available volatile vapors from time to time during operation of the engine. Volatile vapor supply will frequently fluctuate up and down over time depending on the nature of the volatile vapor source (e.g. vaporous hydrocarbons drawn via vacuum pump from soil or liquid fuel tanks, etc.). Referring to FIG. 1, 2 or 17, this situation requires a percentage of base fuel consumption (i.e. from fuel source 107) to initially establish and then maintain normal engine baseline operation as the volatile vapor supply from vapor source 111 fluctuates. When imposing an artificial braking load on the engine 200 to increase fuel consumption particularly volatile vapors which preferably comprises all or at least the majority of fuel consumed, it creates a more challenging operating scenario to balance the percentages of base fuel, air, and volatile vapor necessary to maintain stable engine operation.

Accordingly, in one embodiment, an artificial engine loading system 500 which comprises a programmable auxiliary brake controller 520 is provided in which the braking load is introduced or withdrawn progressively in multiple stages or steps (i.e. "load levels" as referred to herein). Every load level implemented preferably will require the engine to stabilize and stay within the pre-established set engine operating or production parameters. In one non-limiting configuration of the system 500, if all production parameters are met, max base fuel % (i.e. source 107) has not been hit, and a delay timer has expired, the system will proceed to the next higher load level to increase load on the engine and volatile vapor consumption. The system will keep increasing the load until the highest set level has been reached or the max % base fuel is exceeded to maintain engine parameters. The load will increase and decrease as needed during the production process (i.e. combustion of available volatile vapors). Advantageously, the engine loading system 500 will ensure that the engine 200 will be burning the most volatile vapors as possible while still maintaining stable engine operation, as further described herein.

FIG. 17 is a schematic drawing depicting one non-limiting example of an artificial engine loading system 500 according to the present disclosure. The basic combustion engine 103, catalytic converter 123, and fuel, air, and vapor valves 113, 115, 117 may be the same as in the systems shown in FIG. 1 or 2 and fully described above. Description will not be repeated here for sake of brevity. Staged operation of the engine loading system 500 is a complex process which is automatically controlled by a programmable processor-based controller.

With additional reference to FIG. 3, the engine loading system 500 may be configured to operably cooperate with and/or be controlled by the main engine system programmable controller 151 in some embodiments with interface and electronic system architecture modifications for the engine loading system. In certain implementations, control of the engine loading system 500 to apply or remove braking force on the engine crankshaft 502 may be accomplished primarily via a separate dedicated auxiliary brake controller 520. Brake controller 520 is communicably and operably coupled to the main controller 151 for exchanging data and control signals necessary for operating the engine loading system. For example, basic engine operating or "production parameters" collected via the array of sensors described herein by the main controller 151 (e.g. fuel/vapor/air valve positions, O2 levels, oil pressure, engine RPM, etc.) may be used by the main controller to generate control signals transmitted to the brake controller 520 via communication links 550 (which may be hard-wired or wireless) to control operation of the braking or loading system 500. The controllers 151 and 520 may therefore operate in unison and cooperatively to increase or decrease the braking load on the engine 200 and concomitant combustion of volatile vapors in the progressive staged or stepped manner describe above. In one embodiment, two-way communications between the main and brake controllers may be implemented by a controller area network (CAN) or another communication protocol. The foregoing aspects of the engine loading system 500 are further described below.

It bears noting that the main controller 520 makes it possible to retrofit an engine loading system 500 on existing installations of the volatile vapor combustion system disclosed herein. For example, the brake controller 520 may have a plurality of load level outputs which are progressively turned on or off based on control signals generated and transmitted by the main controller 151. For new installations, the functionality of the brake controller 520 may optionally be incorporated directly into the main controller 151 and the brake controller 520 may be omitted. Any of these control configurations may be used in various embodiments.

Referring initially now to FIG. 17, artificial engine loading system 500 includes engine braking device 501 (also referred to herein as a "load cell") operably and mechanically coupled directly or indirectly to engine crankshaft 502 which is rotated by the internal combustion engine 503 in a manner well known in the art. In one example configuration, a round disk-shaped flywheel 503 may be mechanically coupled on a proximal end of the crankshaft 502 opposite to the fan 121 which may be coupled to the distal end of the crankshaft as illustrated.

The engine braking device 501 (shown schematically in FIG. 17) may be a frictionless electromagnetic induction braking device such as for example without limitation an axial retarder such as or similar to those available from Telma Retarder, Inc. of Bartlett, Ill., or others. Such braking devices generally comprise a fixed or stationary stator having magnets and coils which form an inductor and coaxially mounted rotors that are configured to rotate in unison with revolutions of the crankshaft 502 via a mechanical coupling. The braking device 501 may be supported by any suitable type and configuration of a mounting base or frame 508 configured to accommodate the provided mounting interface of the device. Rubber mounts and fasteners may be used in some embodiments to mount the device 501 to frame 508 for reducing mechanical vibrations. In other possible embodiments, other types of devices may be used to apply a braking load or force to the engine crankshaft such as mechanical or hydraulic friction braking devices.

The mechanical coupling between the engine braking device 501 and flywheel 503 affixed to the engine crankshaft may be formed in one non-limiting embodiment by an assembly comprising a mechanical brake shaft coupler 505 and a rubber torsional vibration damper 504 (FIGS. 17-20). Coupler 505 includes an elongated cylindrical operating shaft 507 having a proximal end 518 and distal end 517. A diametrically enlarged circular disk-shaped mounting plate 506 is disposed on the proximal end 518 of the operating shaft 507 nearest the brake. The opposite distal end 517 of the shaft 507 may have a male splined configuration comprising a plurality of radially protruding longitudinal splines 510 configured to engage a mating female splined central hub 512 of the damper 504 comprising a complementary configured central splined opening 511. The mating splines create a rotationally keyed interlocked mounting interface between the coupler 505 and damper 504.

Figures 19, 20:
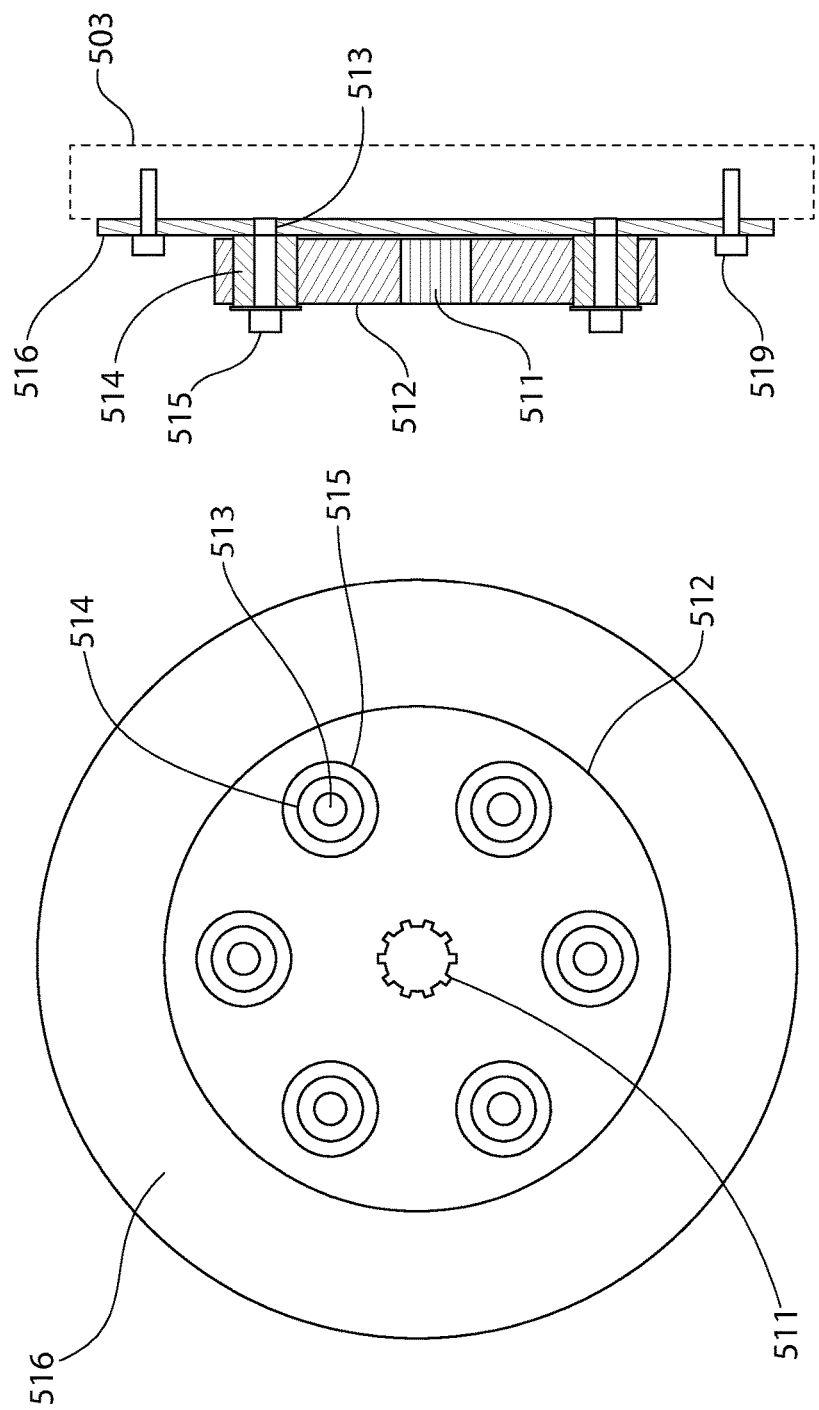
FIG. 19 is a rear elevation view of torsional vibration damper forming part of the brake-to-engine coupling assembly.
FIG. 20 is a side elevation view thereof.

The rubber vibration damper 504 is interposed between the circular flywheel 503 and the brake shaft coupler 505 to absorb vibrations transmitted between the braking device 501 and engine crankshaft 502 when a braking force is applied by the braking device. Damper 504 may generally comprise an assembly of a metal body including a circular flat base plate 516 and raised cylindrical central hub 512 protruding axially therefrom. Hub 512 is a flat circular plate of greater thickness than the base plate in certain embodiments. Base plate 516 mounts the vibration damper 504 to the flywheel 503 via a plurality of threaded fasteners 519 arranged in a circular pattern. Hub 512 includes a plurality of rubber dampened mounting bolt assemblies each comprising a rubber bushing 514 and retainer bolt 515 extending therethrough and engaging threaded holes 513 formed in the base plate 516. The mounting bolt assemblies may be arranged in a circular pattern on the hub. Bushings 514 and bolts 515 detachably mount the hub 512 to the base plate 516 in a vibrationally-dampened manner to minimize transmitting vibrations between the engine braking device 501 and engine crankshaft 502. The splined proximal end 517 of the brake shaft coupler 505 is therefore vibrationally isolated from the engine flywheel 503. A small clearance gap may be provided between the base plate 516 of damper 504 and flywheel 503 as seen in FIG. 20 to avoid direct contact therebetween and transmission of vibrations across the interface.

Figure 18:
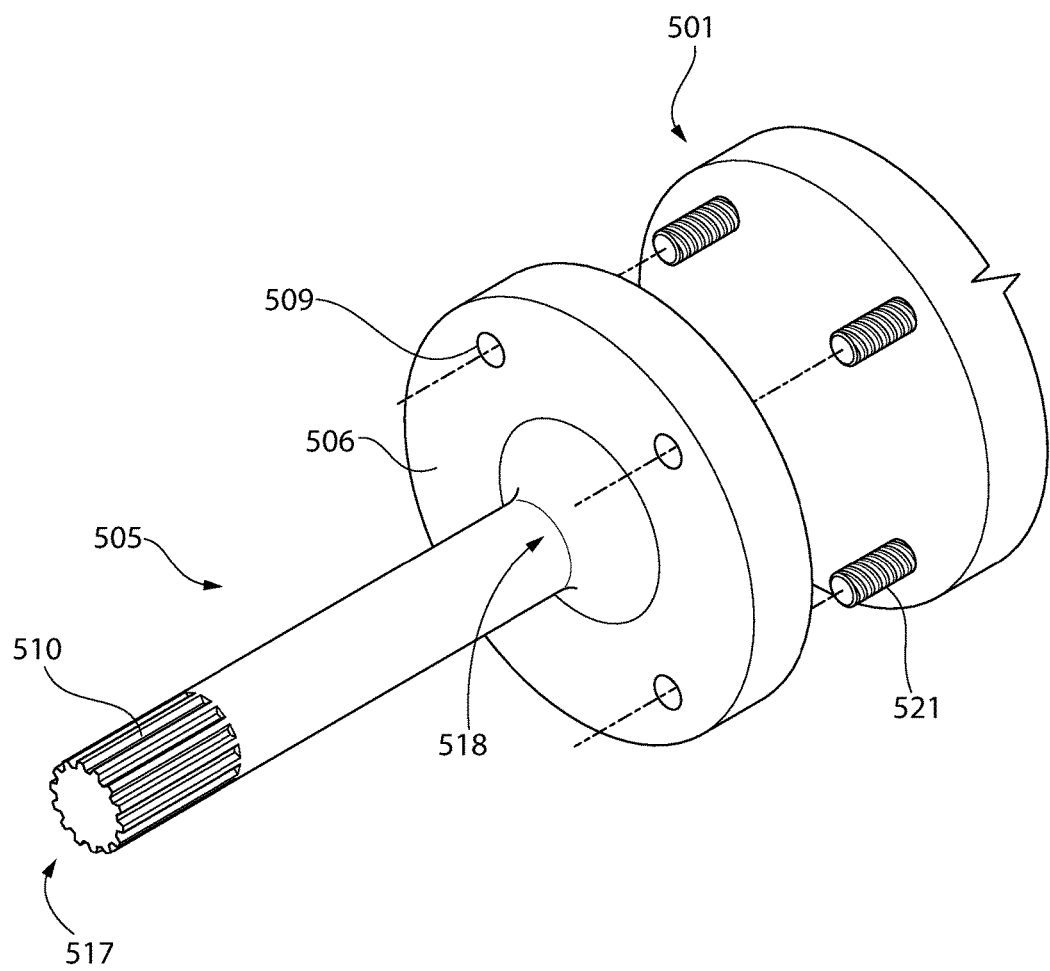
FIG. 18 is perspective view of a mechanical brake shaft coupler for coupling a load cell (engine braking device) to the engine.

Referring to FIG. 18, the mounting plate 506 of the brake shaft coupler 505 may be detachably coupled to the engine braking device 501 via a plurality of axially-oriented threaded mounting bosses or studs 521 formed on the side of the braking device 501 facing the engine crankshaft. Threaded studs 521 are received through mating holes 509 in the mounting plate 506. The mounting plate 506 may be secured to the studs via threaded nuts (not shown). Other types of mounting configurations and methods however are possible and may alternatively be used. When the brake shaft coupler 505 is assembled between the braking device 501 and engine crankshaft 502, rotation of the crankshaft in turn rotates the coupler and the rotors of the braking device via the mounting interface.

Alternative possible ways to couple between the electromagnetic braking device 501 and engine crankshaft 502 include without limitation a universal joint driveshaft, flex plate with spring loaded vibration damping, slip yoke type driveshaft, Lovejoy type power transmission coupler, or direct drive (e.g. mounting device 501 directly to engine flywheel). The invention is not limited by the type of connection used to couple the brake to the crankshaft.

In one non-limiting embodiment, operation of the engine loading system 500 to apply a braking force on the engine may be controlled via separately dedicated auxiliary brake controller 520, as noted above. Brake controller 520 may include a processor and other auxiliary electronic components of the types described above with respect to main controller 151 shown in FIG. 3 necessary to form a fully functional controller, as would be readily known to those skilled in the art without further undue elaboration (e.g. volatile and non-volatile memory, communication module and/or interface connections, input/output devices, etc.). Brake controller 520 is operably and communicably coupled to main controller 151 via wired or wireless communication links 550 to facilitate operation of the engine loading system 500 using the display interfaces and system sensor operating data already collected/monitored by controller 151, as already described herein. In some embodiment, auxiliary brake controller 520 may be physically mounted near or to the same housing as the main controller and represents an auxiliary unit. In some embodiments, the functionality of the auxiliary brake controller 520 may instead be integrated into the main controller 151 instead of as a separate "add on" controller unit. The present invention is not limited to either configuration scenario so long as stepped operation of the braking device 501 is achieved.

As noted above, one goal of the engine loading system 500 is to maximize combustion/consumption of supplementing vaporous fuel from the volatile vapor side of the carburetor, and preferably when possible to burn only volatile vapors while maintaining stable engine operation without any reliance on the primary base fuel (e.g. propane or other) from source 107 if the volatile vapor supply is sufficient. To accomplish this goal, the system is configured via the programmable brake controller 520 to bring the applied braking load on or withdraw it from the engine crankshaft progressively in a plurality of staged steps based on engine production parameters measured by the sensors and collected by the main controller 151 in real time. The brake controller 520 is operable to increase and decrease the applied braking load automatically as needed during the production process based on the quantity of volatile vapors available for consumption at any given time, maintenance of stable engine operation, and percentage of base fuel (e.g. propane) consumption from source 107 as further described herein. In this manner, the engine will be burning the maximum amount of volatile vapors as possible during its operation, which is optimal. Advantageously, the artificial engine loading system 500 will reduce the time necessary to eliminate the volatile vapors at a given remediation installation site. In one non-limiting embodiment described herein, four operational engine load levels may be used as a representative example, recognizing that fewer or more load levels may be used following the same methodology and process.

Figure 21:
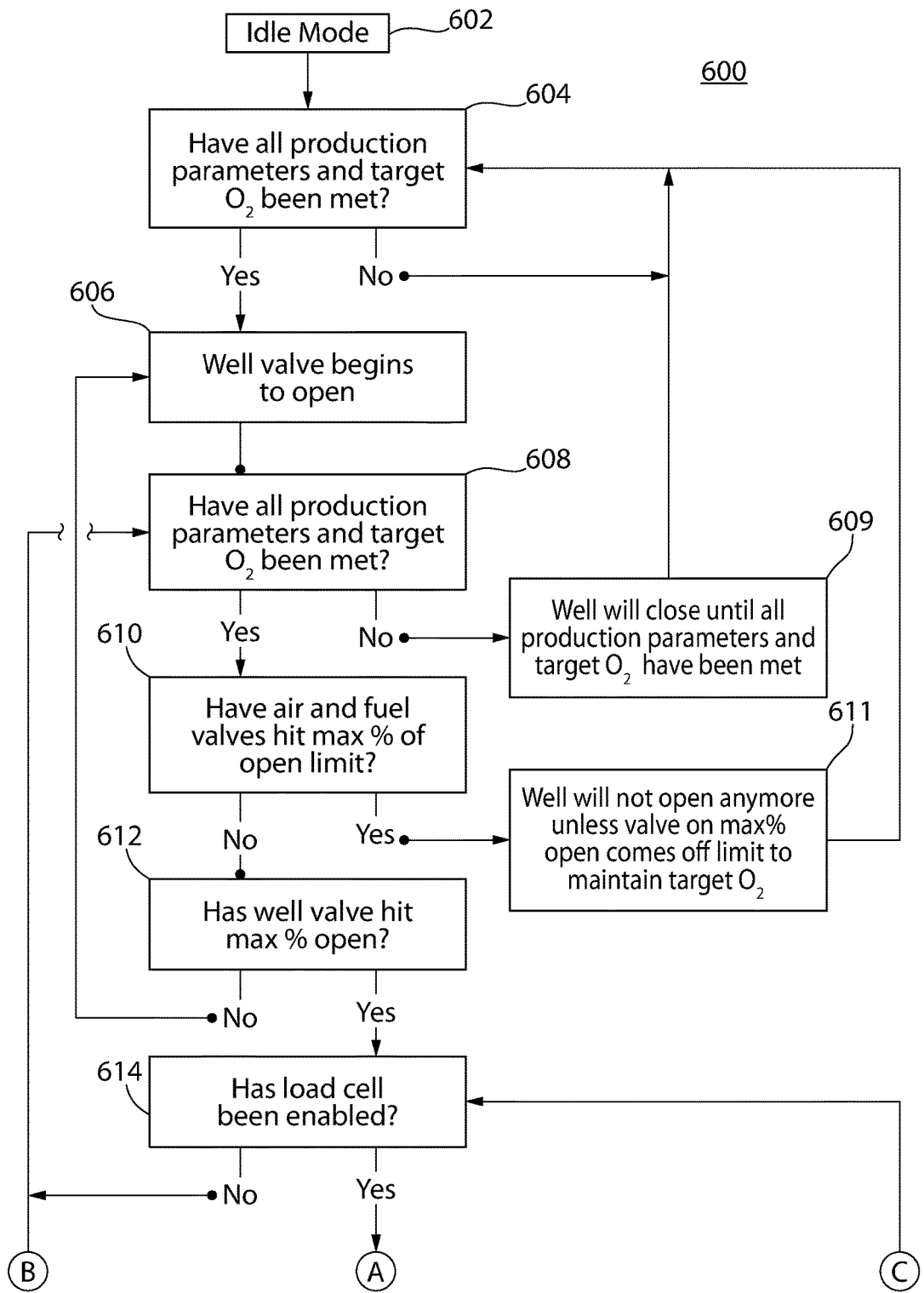
FIGS. 21 and 22 show a control logic process flowchart for configuring a programmable controller for a combustion engine to control the engine loading system.

FIGS. 20 and 21 summarize the main steps in one example method or process 600 for controlling operation of the engine 200 in a staged or stepped manner via the engine loading system 500 to maximize combustion of volatile vapors while maintaining stable engine operation. The following engine loading system process steps and control logic routine may be executed and automatically implemented by the main controller 151, auxiliary brake controller 520, or in combination via executing various program instructions pre-programmed into the controller(s). In a preferred embodiment, the main controller 151 controls the process and the main controller 520 may be relegated to the function of increasing/decreasing the load levels applied or removed from the engine crankshaft by engine braking device 501 in the manner describe above via command/control signals transmitted to the brake controller by the main controller. For ease of description, it will be assumed for this example production process that the brake controller 520 is programmed to automatically execute the following steps and process associated with the progressively applied or withdrawn braking load operating scenarios. Operation and control of other primary engine and carburetor functions (e.g. changing fuel, air, or vapor source valve positions, etc.) may be performed in the manner already described herein by the main controller 151 Primary valve, engine, and/or carburetor performance or production data may be obtained by the main programmable controller 151 which is used to control the auxiliary brake controller 520 for use in the staged engine load application process.

To start the production process 600 for combusting and eliminating volatile vapors, the engine 200 is initially started with the base fuel and air intake valves 113, 115 open in step 602 (Idle Mode). Notably, the volatile vapor intake valve 117 is shut off at this point during the engine warmup process until normal engine operating temperatures and conditions are reached to establish stable engine operation using only the base fuel from source 107. The base fuel may be propane in one embodiment; however, other gaseous or liquid fuels (e.g. diesel, gasoline, etc.) may be used in certain implementations. A test is performed by main controller 151 in Step 604 to determine whether all baseline or setpoint production parameters including a target O2 (oxygen) air/fuel ratio have been met by the engine system operation. These baseline parameters and target O2 may be preprogrammed into main controller 151 prior to the production run.

The target O2, one of the baseline operating or production parameters, represents the air/fuel mixture ratio which is derived from the O2 sensors 223, 225 communicably and operatively coupled to the main controller 151 (see, e.g. FIG. 14, engine page 295). The O2 sensors collect and send real-time air/fuel mixture feedback (e.g. 12.5 A/F, etc.) to the controller. Through the touchscreen display 159 or other data input device, the user can set a target O2 value (A/F ratio) and the O2 sensors gives real time feedback. The main controller 151 then automatically adjusts the various engine operating values to achieve the target.

In one non-limiting example, the baseline operating or production parameters preprogrammed into main controller 151 which are verified by the controller by comparison to real-time operating data may include without limitation:—Pre/Post catalytic converter engine exhaust temperatures in range;—Target O2 is met and maintained within X % of target;—O2% difference in range;—Water temperature in range;—Oil PSI above minimum set point;—LEL (lower explosive limit) below maximum set point;—No maximum % base fuel (flow-based) or % air (flow-based) have been hit;—Max KO tank vacuum has not been exceeded;—No external operator or machine safety's have been tripped; and—Regular maintenance timer has not been exceeded. Fewer, more, and/or different baseline production parameters may be used so long as these parameters are preferably indicative of stable engine operation or other relevant considerations associated with operating the engine system.

Figure 22:
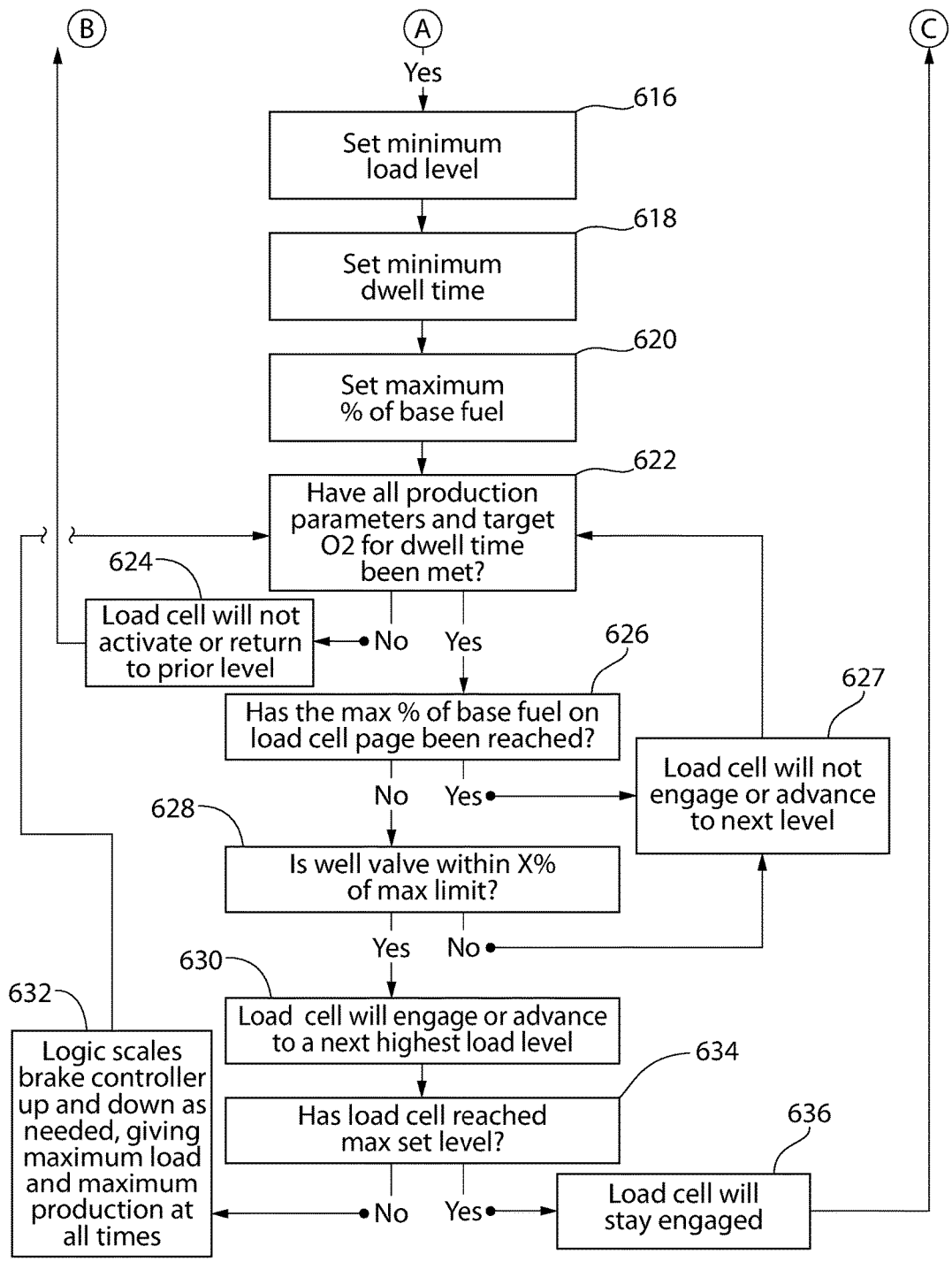

Returning to Step 604, if the production parameters and target O2 conversely have not been met, engine operation continues until these conditions are satisfied. Once stable engine operating status is reached (a "Yes" response to test in Step 604), control passes to Step 606. In Step 606, the volatile vapor intake valve 117 ("well valve" in FIGS. 21-22) begins to open gradually to now allow the vapors to be drawn from source 111 and mixed with intake air (from source 109) and base fuel (from source 107) in the carburetor 105 such as via the vacuum produced by the engine. A volatile vapor intake valve 117 maximum % open (from 0-100%) and associated time period (e.g. minutes) over which the maximum % open is to be gradually attained is preprogrammed into main controller 151 at the start of the production process. For example, the user program the volatile vapor intake valve 117 to open a maximum of 80% gradually over a period of 60 minutes by repeating the tests in Steps 608, 610, and 612 are achieved.

Steps 606 to 612 define a control loop for controlling the gradual opening of the volatile vapor intake valve 117. Once valve 117 begins to open in Step 606, a test is performed in Step 608 to determine whether the production parameters and target O2 are being met with introducing volatile vapors via the volatile vapor intake valve 117 being X % initially open. If not, control passes to Step 609 which closes the volatile vapor intake valve 117 and passes control back to step 604 until production parameters and target O2 are met. On the other hand if the response in test Step 608 is "Yes," the test in Step 610 is performed to determine whether the air intake valve 115 and base fuel intake valve 113 maximum % open limits have been met for each valve. The maximum % open positions for each of these two valves are preprogrammed into main controller 151 at the start of the production process (e.g. 0-100 percent open).

Notably, Step 610 indirectly determines whether there is a sufficient supply of volatile vapors from source 111 to at least partially sustain engine operation given that the quantity of volatile vapors available may vary over time of day based on changing ambient conditions in some cases, as already explained herein. If in Step 610 a "Yes" response is returned by main controller 151, this indicates that production parameters and O2 target are only being met due to combusting a maximum amount of base fuel despite some contribution from the volatile vapor source (depending on the % open of the well valve). Control passes to Step 611 which stops opening the volatile vapor intake valve 117 any further until the process control finds that the base fuel or O2 intake valve 113, 115 has come off its maximum % of open preprogrammed limit (i.e. passing control back to repeat Steps 604, 606, 608, and 610).

Alternatively in Step 610, if the base fuel and O2 intake valves 113 have not reached their maximum % open, control passes forward to step 612 which determines whether the well valve (volatile vapor intake valve 117) has hit its maximum % open preprogrammed into main controller 151 as noted above. If not, control passes back to Step 606 which opens the well valve a little more and Steps 608, 610, and are repeated. This control loop continues and the well valve gradually opens more each time provided the conditions in Steps 608, 610, and 612 continue to be met.

Once the volatile vapor intake valve 117 has hit its maximum % open position in the test of Step 612, the system is now in condition to activate and take advantage of the engine loading system 500. In essence, this means that engine production parameters and O2 targets can be met by burning volatile vapors without maximizing base fuel consumption. Process control passes to Step 614 in which the main controller 151 checks whether the engine loading system 500 has been powered on and activated for use. If not, the user does not presently intend to increase engine load and consumption of volatile vapors at the present time. The engine loading system 500 will not be active and the volatile vapor combustion system will operate in the original manner already described herein. If the system is enabled in Step 614, control passes to Step 616 to implement the imposition of an artificial load on engine 103 via engine braking device 501 (also referred to as "load cell 501" herein for brevity).

Figure 23:
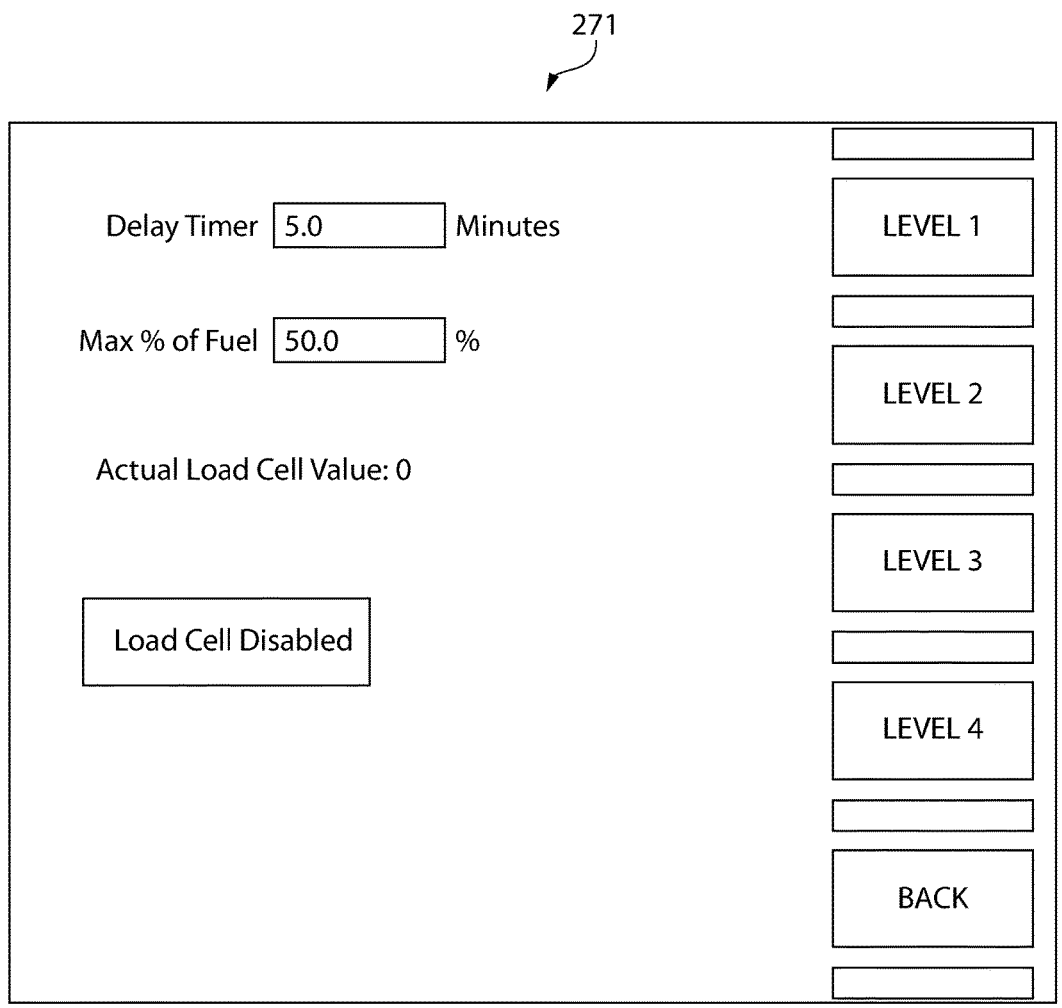
FIG. 23 is a screenshot showing a load cell data page for display by a programmable controller for a combustion engine.

In Step 616, the minimum load level representing the minimum braking force to be applied to the engine 200 by braking device 501 is programmed and set in brake controller 520 by the user. This minimum load represents Load Level 1. The load level may be represented in engineering units by ft.-lbs. (foot-pounds) or Nm (Newton-meters) of torque applied to the engine crankshaft 502. The minimum load level is programmed via the Load Cell screen or page 530 on visual display 159 (see, e.g. FIG. 3) which may be accessed from the maintenance screen or page 261 in FIG. 5. Display 159 may be a touch sensitive display or screen for as further described herein. FIG. 23 depicts one non-limiting example of a Load Cell page 530 which may be used. The user selects the Load Cell button on page 261 and then the Load Level 1 button on page 530 when it appears to enter the desired minimum load level (foot-lbs.). The "buttons" may be soft buttons such as active icon on the touch screen display 530 and/or a hard button adjacent the icon on the screen. The engine load to be applied for each successively higher load level step may be preselected and preprogrammed into brake controller 520 in a similar manner by selecting the Level 2, Level 3, and Level 4 buttons. This provides the capability of setting non-uniform incremental increases of loads from one Load Level to the next if desired. Alternatively, the program instructions or software may be configured to automatically increase the engine load by an amount equal to the minimum load level entered without the user having to input a specific load level for each of Level 2, 3, and 4. Either scenario may be used. In one representative non-limiting example, Load Level 1 may be about 110 ft.-lbs. and the incremental increase from each load level to the next may also be 110 ft.-lbs. Larger or smaller incremental increases may be used. The incremental change in load between each load level need not be equal to the minimum load level and/or may be different between different load levels.

In Step 618, a delay time or "dwell time" is programmed into main controller 151 by the user via selecting the Delay Time input field on Load Cell screen 530. The main controller 151 implements a time to be activated when appropriate based on the entered dwell time (e.g. minutes). The dwell time represents a period or interval of time (e.g. minutes or hours) which must lapse or pass that corresponds to the minimum amount of time considered necessary to accurately signify that engine operation is stable (i.e. the engine production parameters or other conditions are met) before the next successively higher load is imposed on the engine by the braking device 501.

In Step 620, the maximum "base fuel" percentage is set and programmed into brake controller 520 by the user via selecting the Maximum % Base Fuel input field on the Load Cell screen or page 530. The base fuel percentage is measured by the main controller 151 via valve sensor 171 operable to detect the "degree of open" position or percentage of the main fuel intake valve 113 as described herein. The maximum base fuel percentage limit set by the user represents the maximum desired percentage of base fuel (i.e. a base fuel crossover point) that the user considers should not be exceeded when running at an artificially imposed load level while consuming volatile vapors. If this value is exceeded, then it is assumed that the engine 200 must primarily rely on and burn base fuel from source 107 in order to sustain stable engine operation at the present load level. In principle, it bears noting that the base fuel percentage is indirectly indicative of the quantity of volatile vapors available at any given time during operation of the engine 200. For example, if engine 200 is running on volatile vapors and 50% base fuel for a period of time at Load Level 1, and during the next system check by controller 520 the base fuel percentage is found to have increased, this signifies that the quantity of volatile vapors available has dropped because the engine now requires more base fuel to maintain stable operation at Load Level 1. When the preprogrammed base fuel % limit is reached, it therefore now becomes desirable for brake controller 520 to reduce the load level or deactivate off the braking device completely to conserve base fuel until the volatile vapor supply increases.

In some operating scenarios, it should be noted that the minimum load level and other levels, minimum dwell time, and maximum % of base fuel may have already been previously preprogrammed into main controller 151 by the user. In such a case, the main controller will simply verify the presence of these preprogrammed values in the system during Steps 616, 618, and 620.

Returning to FIGS. 21 and 22, the process continues in Step 622 in which the main controller 151 determines whether all pre-selected engine production parameters and target O2 are presently being met by operation of the engine to signify a stable condition before activating the braking load. If not, control passes to Step 624 and back to Step 608 to repeat the process until an affirmative response is returned in step 622. If all production parameters and target O2 is met, control passes to Step 626 which implements a test to determine whether the max % of base fuel previously input on the Load Cell page 530 has been reached. If it has, control then passes back to Step 622. This indicates too great a reliance on and consumption of base fuel is needed to sustain stable engine operation meaning volatile vapor supply is presently inadequate to activate the load cell.

At this point in the process, it should be noted that the engine braking device 501 (load cell) is enabled (energized and powered on) and ready-to-operate, but is not activated yet to apply a braking force to the engine crankshaft 502 yet. The engine 200 is also currently still operating on both base fuel 107 and volatile vapors 111.

In Step 626, if the controller 151 determines that the maximum base fuel % burn has not been reached, control passes to Step 628 to determine if the well valve 117 is opened within X % of its preprogrammed maximum limit reflected in Step 612 and discussed above. In one non-limiting example, an X value of 5% may be used. If a negative response is returned in Step 626, the engine braking device 501 will not be activated in Step 616. Control passes back to Step 622 to continue monitoring engine performance, base fuel consumption, and well valve 117 position.

It bears noting that the well intake valve 117 is a slow acting and opening valve in one embodiment. By contrast, the air and base fuel intake valves 113, 115 respond quickly to keep target O2 and RPM in check under control of the programmable controller 151. Although the programmable controller 151 initially checks to confirm that the position of well intake valve 117 has reach the preprogrammed % open in Step 612, the controller thereafter can automatically change position of the well valve during a production run for example if the controller discovers that the volatile vapors become lean and the air valve is at its min % open. In certain operating situations, for example, the base fuel may not have reached the max % yet in Step 626 but the controller may detect that the well intake valve 117 has started to close and is no longer within X % of its maximum limit in Step 628, thereby signaling a drop in available volatile vapor supply. Accordingly, the system is configured in the embodiment described herein to require the checks of both Steps 626 and 628 before implementing the initial engine braking force or changing levels of braking force; either of which would represent a fluctuation and drop in available volatile vapors to an unacceptable level.

If in Step 628 the main controller 151 determines that the well valve 117 is opened within X % of its maximum limit (i.e. degree open), the load cell (i.e. engine braking device 501) will be activated and engaged to turn on Load Level 1 which will apply a first braking force or load on the engine crankshaft 502 in Step 630. Control passes to Step 634 to determine whether the load cell has reached the maximum set (preprogrammed) load level yet (e.g. Load Level 4). If affirmative, the load cell will remain energized and operate at the maximum applied braking force load level. Control passes back to Step 614 to continue monitoring the engine production process as described above.

If in Step 634 the load cell has not reached the maximum set (preprogrammed) level yet (e.g. operating at Load Levels 1, 2, or 3 in this example), control passes back to Step 622 to repeat the foregoing steps 622, 626, 628, 630, and 634, thereby implementing a control loop 632 for gradually and successively implementing the next highest load level. Each load level is different than every other load level. In Step 622, the next time main processor 151 again determines that the engine production parameters and target O2 are presently being met by operation of the engine at the present initial load level (e.g. Load Level 1) for example for the duration of the preprogrammed dwell time, Step 630 will turn on the next sequentially higher load level (e.g. Load Level 2) through the cycle, and so forth until the maximum load level (Load Level 4 in this example) is reached.

During cycling of the engine loading system control loop 632, if a negative result occurs in the test of Step 622 when already operating at Load Levels 2-4, the load will not advance to the next level and instead return to the prior lower level until production parameters and target O2 are met for the dwell time. The process flow will continually decrease the load level in a stepped manner if these production parameters and target O2 are not met for each dwell time period. If on the other hand the engine loading system 500 is operating at Load Level 1 in Step 622 and conditions are not met, the engine braking device 501 will be deactivated and control returns to Step 608. When the vapors start to go lean, the programmable controller may be configured so that the load level will drop when the base fuel valve hit its max % or the well valve goes lower than its max %.

Numerous variations of the foregoing process are possible.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A remediation system for combusting volatile vapors, the system comprising:
   an internal combustion engine comprising a rotatable crankshaft;
   a carburetor operably coupled to the engine, the carburetor having a first intake valve receiving base fuel from a primary fuel source, a second intake valve receiving external air from an external air source, and a third intake valve receiving volatile vapors from a vapor source, the carburetor configured to combine the base fuel, external air, and volatile vapors fuel to form a combustion mixture and discharge the mixture to the engine;
   an electromagnetic braking device operably coupled to the crankshaft of the engine, the braking device changeable in state between an activated state and a deactivated state, the braking device configured to apply an adjustable braking load on the engine crankshaft when in the activated state for increasing combustion of volatile vapors from the vapor source; and
   a programmable controller operably coupled to the braking device, the controller configured to:
      receive real-time engine operating data measured during operation of the engine by a plurality of sensors communicably coupled to the controller;
      compare the real-time engine operating data against baseline engine operating parameters pre-programmed into the controller; and
      automatically activate the braking device to apply the braking load to the engine based on the real-time engine operating data meeting the baseline engine operating parameters.

2. The system according to claim 1, wherein the programmable controller does not apply the braking load on the engine with the braking device when the baseline engine operating parameters are not met by the real-time engine operating data.

3. The system according to claim 1, wherein after the braking device has been activated, the controller is further configured to deactivate the braking device when the controller determines that the baseline engine operating parameters are not met by the real-time engine operating data.

4. The system according to claim 1, wherein the programmable controller is configured to apply a preprogrammed constant first load level with the braking device for a dwell time period pre-programmed into the controller when the baseline engine operating parameters are met by the real-time engine operating data.

5. The system according to claim 1, wherein the programmable controller is further configured to apply a higher preprogrammed constant second braking load level on the engine with the braking device when the baseline engine operating parameters are met by the real-time engine operating data at an expiration of the dwell time period while operating the engine at the first braking load level.

6. The system according to claim 5, wherein the programmable controller is further configured to decrease the second load level back to the first load level when the baseline engine operating parameters are not met by the real-time engine operating data while operating the engine at the second load level.

7. The system according to claim 1, wherein each of the first, second, and third intake valves each have an associated valve position sensor operable to sense a respective position of each valve indicative of a respective flow percent; and wherein the baseline engine operating parameters for the comparison to real-time engine operating data necessary to activate the braking device includes first intake valve flow percent, second intake valve flow percent, and third intake valve flow percent.

8. The system according to claim 1, wherein the baseline engine operating parameters for the comparison to real-time engine operating data includes a preprogrammed target oxygen level in exhaust gas from the engine.

9. The system according to claim 1, wherein the braking device is an electromagnetic induction braking device.

10. The system according to claim 1, wherein the programmable controller includes a plurality of braking load levels and a dwell time period pre-programmed into the programmable controller, the programmable controller configured to automatically change braking load levels when the braking device is in the activated state.

11. The system according to claim 10, wherein each braking load level represents a different predetermined constant braking force applied by the braking device to the engine crankshaft for the duration of the preprogrammed dwell time period, each braking load level being different in magnitude from any other braking load level.

12. The system according to claim 1, further comprising an interactive electronic touchscreen display operably coupled to the programmable controller and configured to provide a user interface, the display operable to pre-program the baseline engine operating parameters into the programmable controller.

13. A remediation system for combusting volatile vapors, the system comprising:
an internal combustion engine comprising a rotatable crankshaft;
a carburetor operably coupled to the engine, the carburetor having a first intake valve receiving base fuel from a primary fuel source, a second intake valve receiving air from an air source, and a third intake valve receiving volatile vapors from a vapor source, the carburetor configured to combine the base fuel, air, and volatile vapors to form a combustion mixture and discharge the mixture to the engine;
each of the first, second, and third intake valves having an associated valve position sensor operable to sense a respective position of each valve indicative of a respective flow percent;
an electromagnetic braking device operably coupled to the crankshaft of the engine, the braking device changeable in state between a deactivated state and an activated state wherein the braking device is configured to apply an adjustable braking load on the engine crankshaft for increasing combustion of volatile vapors from the vapor source;
a programmable controller operably coupled to the braking device and the valve position sensors, the programmable controller configured to automatically change the state of the braking device based on a sensed real-time position of at least the first intake valve.

14. The system according to claim 13, wherein the programmable controller is configured to compare the sensed real-time position of the first intake valve against a preprogrammed maximum percent open limit of the first intake valve, and wherein the programmable controller will not activate the braking device when the maximum percent open limit has been met or exceeded.

15. The system according to claim 14, wherein the programmable controller is further configured to compare a sensed real-time position of the third intake valve against a preprogrammed maximum percent open limit of the third intake valve, and wherein the programmable controller will not activate the braking device unless the maximum percent open limit of the third intake valve has been met or exceeded.

16. The system according to claim 13, wherein:
the programmable controller is configured to automatically control the operation and position of the third intake valve, the third intake valve movable between a closed position and a maximum percent open position preprogrammed into the programmable controller; and
wherein the programmable controller is programmed to gradually open the third intake valve from the closed position to the maximum percent open position over a period of time preprogrammed into the programmable controller to provide stable engine operation.

17. The system according to claim 13, wherein the programmable controller is pre-programmed with a plurality of different constant engine braking load levels each of different magnitude, and the programmable controller is further configured to increase or decrease the engine braking load level based on a sensed position of the third intake valve and the sensed position of the first intake valve.

18. The system according to claim 17, wherein the programmable controller is further configured to: (i) compare an actual base fuel consumption measured by the position sensor of the first intake valve against a predetermined maximum base fuel consumption setpoint pre-programmed into the programmable controller; and (ii) switch the load levels to the next successively higher or lower load level based on the comparison of the actual base fuel consumption against the base fuel consumption setpoint.

19. A remediation system for combusting volatile vapors, the system comprising:
- an internal combustion engine comprising a rotatable crankshaft;
- a carburetor operably coupled to the engine, the carburetor base fuel receiving from a primary fuel source, air from an air source, and volatile vapors from a vapor source, the carburetor configured to combine the base fuel, air, and volatile vapors to form a combustion mixture and discharge the mixture to the engine;
- an electromagnetic braking device operably coupled to the crankshaft of the engine, the braking device changeable in state between an activated state and a deactivated state, the braking device configured to apply an adjustable braking load on the engine crankshaft when in the activated state for increasing combustion of volatile vapors from the vapor source.

20. The system according to claim 19, further comprising a flywheel fixedly coupled to an end of the crankshaft and rotatable therewith, the braking device operably coupled to the flywheel.

21. The system according to claim 19, further comprising a programmable controller operably coupled to the braking device for controlling operation thereof, the programmable controller configured to: (1) change state of the braking device, and (2) increase or decrease the applied braking load on the engine crankshaft.

22. The system according to claim 21, further comprising:
- an oxygen sensor configured to sense a real-time oxygen level of exhaust from the engine indicative of an air/fuel ratio of the combustion mixture;
- the programmable controller being configured to automatically activate or deactivate the braking device based on comparing the sensed oxygen level of the engine exhaust to a target oxygen level preprogrammed into the programmable controller.

23. The system according to claim 19, further comprising a vibration damper operably coupled to the flywheel, and a mechanical brake shaft having a first end fixedly connected to the vibration damper and a second end fixedly connected to the braking device.

24. The system according to claim 23, wherein the brake shaft is fixedly connected to the vibration damper via a keyed spline interface.

* * * * *